(12) United States Patent
Hirakawa et al.

(10) Patent No.: US 10,195,945 B2
(45) Date of Patent: Feb. 5, 2019

(54) CONTROL DEVICE FOR ELECTRIC VEHICLE AND CONTROL METHOD FOR ELECTRIC VEHICLE

(71) Applicant: NISSAN MOTOR CO., LTD., Yokohama-shi, Kanagawa (JP)

(72) Inventors: Yoichi Hirakawa, Kanagawa (JP); Ken Itou, Kanagawa (JP); Yuji Katsumata, Kanagawa (JP); Hiroyuki Komatsu, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/747,996

(22) PCT Filed: Jul. 29, 2015

(86) PCT No.: PCT/JP2015/071539
§ 371 (c)(1),
(2) Date: Jan. 26, 2018

(87) PCT Pub. No.: WO2017/017816
PCT Pub. Date: Feb. 2, 2017

(65) Prior Publication Data
US 2018/0244157 A1 Aug. 30, 2018

(51) Int. Cl.
*B60L 7/26* (2006.01)
*B60L 7/24* (2006.01)
*B60L 7/10* (2006.01)
*B60W 30/18* (2012.01)
(Continued)

(52) U.S. Cl.
CPC ........ *B60L 7/26* (2013.01); *B60L 7/10* (2013.01); *B60L 7/18* (2013.01); *B60L 7/24* (2013.01);
(Continued)

(58) Field of Classification Search
None
See application file for complete search history.

(56) References Cited

U.S. PATENT DOCUMENTS 6,011,378 A 1/2000 Tabata et al.
2001/0020554 A1 9/2001 Yanase et al.
(Continued)

FOREIGN PATENT DOCUMENTS

| EP | 0 704 337 A2 | 4/1996 |
|----|--------------|--------|
| JP | 8-98305 A | 4/1996 |
| JP | 2001-238303 A | 8/2001 |
| JP | 2002-238105 A | 8/2002 |

(Continued)

*Primary Examiner* — Richard M Camby
(74) *Attorney, Agent, or Firm* — Foley & Lardner LLP

(57) ABSTRACT

A control device is provided for an electric vehicle that generates a braking force corresponding to an opening degree of an accelerator pedal to decelerate the electric vehicle. The control device for the electric vehicle includes a motor configured to generate a driving force or a regenerative braking force of the electric vehicle, a friction braking unit configured to generate a friction braking force, and a controller configured to control at least one of the motor and the friction braking unit corresponding to the opening degree of the accelerator pedal. The controller determines whether all of regenerative electric power generated by the motor is consumed in the electric vehicle when the motor is caused to perform a regenerative braking. The controller causes the motor to perform the regenerative braking when the regenerative electric power is determined to be consumed in the electric vehicle.

7 Claims, 20 Drawing Sheets

(51) Int. Cl.
*B60L 7/18* (2006.01)
*B60L 11/18* (2006.01)
*B60W 10/08* (2006.01)
*B60W 10/184* (2012.01)

(52) U.S. Cl.
CPC .......... *B60L 11/1851* (2013.01); *B60W 10/08* (2013.01); *B60W 10/184* (2013.01); *B60W 30/18127* (2013.01); *B60L 2240/16* (2013.01); *B60L 2240/423* (2013.01); *B60T 2270/60* (2013.01); *B60T 2270/604* (2013.01); *B60W 2520/04* (2013.01); *B60W 2540/10* (2013.01); *B60W 2710/18* (2013.01)

(56) References Cited

U.S. PATENT DOCUMENTS

| | | | |
|---|---|---|---|
| 2006/0102394 A1 | 5/2006 | Oliver | |
| 2012/0022735 A1 | 1/2012 | Tashiro et al. | |
| 2015/0094926 A1 | 4/2015 | O'Meachair | |
| 2016/0347202 A1* | 12/2016 | Sawada | B60L 15/20 |
| 2017/0021731 A1* | 1/2017 | Suzuki | B60L 7/26 |

FOREIGN PATENT DOCUMENTS

| | | |
|---|---|---|
| JP | 2009-196404 A | 9/2009 |
| JP | 2012-29461 A | 2/2012 |
| JP | 2012-195263 A | 10/2012 |
| JP | 2015-047923 A | 3/2015 |
| JP | 2015-085820 A | 5/2015 |
| WO | WO 2015/080027 A1 | 6/2015 |

\* cited by examiner

CONTROL DEVICE FOR ELECTRIC VEHICLE AND CONTROL METHOD FOR ELECTRIC VEHICLE

TECHNICAL FIELD

The present invention relates to a control device for an electric vehicle and a control method for the electric vehicle.

BACKGROUND ART

Braking force used when an electric vehicle is decelerated or stopped is obtained from regenerative braking by a motor and friction braking by a brake. The regenerative braking has a better controllability of the braking force than that of the friction braking. Thus, to smoothly stop the electric vehicle, it is preferable to stop the vehicle by the regenerative braking, not by the friction braking. Especially, in a vehicle that performs driving and braking of the motor according to an opening degree of an accelerator pedal, it is necessary to stop the vehicle by adjusting the braking force according to disturbance. Thus, it is preferable to perform the regenerative braking having good controllability just before stop of the vehicle.

However, conventionally, if the regenerative braking is performed when a battery is in a full charge state, the battery is possibly excessively charged. Thus, when the battery is in the full charge state, the electric vehicle is stopped by the friction braking, not the regenerative braking (JP2012-29461A).

SUMMARY OF INVENTION insofar as the battery is in the full charge state, if the regenerative braking is performed, the battery is excessively charged. Thus, the friction braking has to be performed. Therefore, there is a problem that the electric vehicle cannot be smoothly stopped.

It is an object of the present invention to provide a technique that solves a problem that an electric vehicle cannot be smoothly stopped when a battery is in a full charge state.

According to one embodiment of the present invention, a control device for an electric vehicle that generates a braking force corresponding to an opening degree of an accelerator pedal to decelerate the electric vehicle. The control device for the electric vehicle comprising: a motor configured to generate a driving force or a regenerative braking force of the electric vehicle; a friction braking unit configured to generate a friction braking force; and a controller configured to control at least one of the motor and the friction braking unit corresponding to the opening degree of the accelerator pedal. The controller determines whether all of regenerative electric power generated by the motor is consumed in the electric vehicle when the braking force is generated by the motor alone, and generates the regenerative braking force by the motor when the controller determines that all of the regenerative electric power is consumed in the electric vehicle.

DESCRIPTION OF EMBODIMENTS

The following describes embodiments of the present invention with reference to the drawings.

First Embodiment

Figure 1:
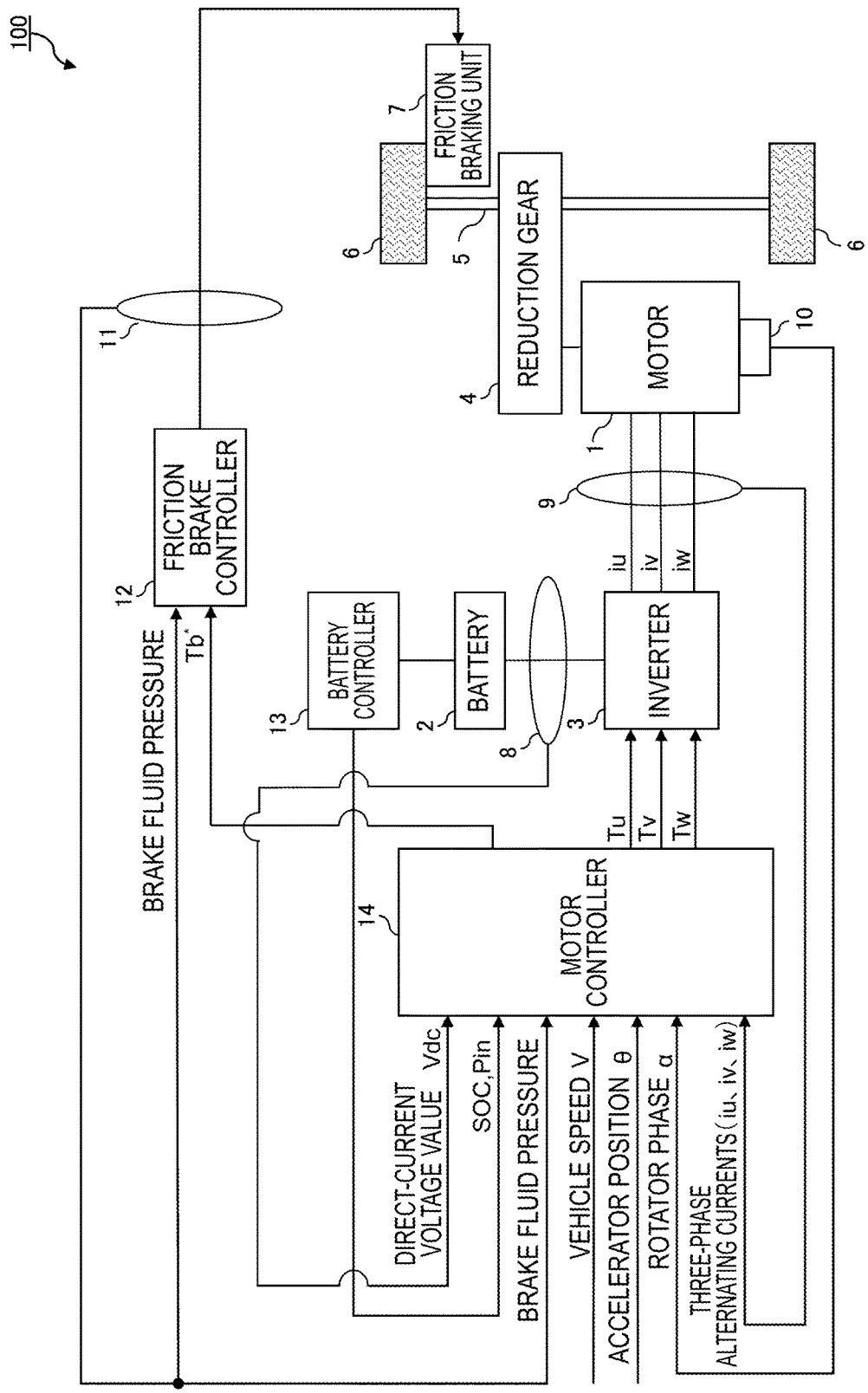
FIG. 1 is a schematic configuration diagram of an electric vehicle including a motor controller of a first embodiment.

FIG. 1 is a schematic configuration diagram of an electric vehicle 100 that includes a motor controller 14 as a control device according to the first embodiment.

The electric vehicle 100 includes a motor 1 as a part of or the entire driving source. In this embodiment, it is assumed that the motor 1 mounted to the electric vehicle 100 operates in three-phases (U, V, and W phases). It should be noted that the electric vehicle 100 may be an electric vehicle that uses an electric motor as a driving source and a hybrid vehicle that uses an electric motor and an engine as driving sources.

The electric vehicle 100 according to the embodiment can perform acceleration and deceleration and stop only by operating an accelerator pedal. That is, a driving torque and a regenerative torque generated by the motor 1 are determined according to an opening degree of the accelerator pedal. Therefore, an increase in the opening degree of the accelerator pedal increases the driving torque generated by the motor 1, accelerating the electric vehicle 100. Additionally, the reduction in the opening degree of the accelerator pedal reduces the driving torque generated by the motor 1 or increases a regenerative braking force by the motor 1 and a friction braking force by a friction braking unit 7, decelerating or stopping the electric vehicle 100. It should be noted that although the electric vehicle 100 may include a brake pedal, the brake pedal is used in the case where a braking force larger than a braking force generated when the opening degree of the accelerator pedal becomes zero is required.

The electric vehicle 100 includes the motor 1, a battery 2, an inverter 3, a reduction gear 4, a shaft 5, driving wheels 6, the friction braking unit 7, a voltage sensor 8, a current sensor 9, a rotation sensor 10, a fluid pressure sensor 11, a friction brake controller 12, a battery controller 13, and the motor controller 14.

The motor 1 includes a rotator that operates by three-phase electric powers (U, V, and W phases). In the motor 1, flowing three-phase alternating currents iu, iv, and iw from the battery 2 through the inverter 3 generates a torque according to the alternating currents iu, iv, and iw. The torque generated in the motor 1 is transmitted to the driving wheels 6 via the reduction gear 4 and the shaft 5. The motor 1 performs regenerative braking to decelerate or stop the electric vehicle 100. The regenerative braking by the motor 1 generates regenerative electric power, and the battery 2 is charged by the regenerative electric power. It should be noted that the regenerative electric power generated by the motor 1 is an AC power.

The battery 2 is a batter that can be charged and discharged, such as a lithium battery. A DC electric power supplied from the battery 2 is converted into the AC power by the inverter 3, and this AC power is supplied to the motor 1. The battery 2 is charged not only at a charging station but also is charged by the regenerative electric power generated in the motor 1 while the electric vehicle 100 decelerates. The voltage sensor 8 is disposed between the battery 2 and the inverter 3.

The inverter 3 converts a direct current output from the battery 2 into the three alternating currents iu, iv, and iw according to a duty ratio (%) of PWM signals Tu, Tv, and Tw output from the motor controller 14. The inverter 3 supplies the convert alternating currents iu, iv, and iw to the motor 1. It should be noted that in the case where the motor 1 generates the regenerative electric power and outputs the alternating current, the inverter 3 converts the alternating current into the direct current and outputs the converted direct current to the battery 2. The current sensor 9 is disposed between the inverter 3 and the motor 1.

The inverter 3, for example, includes two pieces of switching elements (not illustrated), which are provided corresponding to each of the U, V, and W phases. In the inverter 3, according to the duty ratio of the PWM signals Tu, Tv, and Tw, on and off of the switching elements are switched. The direct current supplied from the battery 2 by the switching of the switching elements is converted into the desired alternating currents iu, iv, and iw, and the alternating currents iu, iv, and iw are supplied to the motor 1.

It should be noted that as the switching elements, there have been provided a power semiconductor device such as an Insulated Gate Bipolar Transistor (IGBT) and a Metal-Oxide-Semiconductor Field-Effect Transistor (MOS-FET).

The reduction gear 4 converts the torque generated in the motor 1 and transmits the converted torque to the shaft 5. A ratio that a rotation speed of the motor 1 is converted into a rotation speed of the shaft 5 is referred to as a final gear ratio. That is, the reduction gear 4 converts the rotation speed of the motor 1 into the rotation speed of the shaft 5 according to the final gear ratio.

The shaft 5 is rotated by the torque transmitted from the motor 1 via the reduction gear 4.

The driving wheels 6 are mounted to both ends of the shaft 5 and rotate in accordance with the rotation of the shaft 5. Thus, the rotation of the driving wheels 6 causes the electric vehicle 100 to run.

The friction braking unit 7 is a friction braking and is disposed adjacent to the driving wheel 6. The friction braking unit 7 and the friction brake controller 12 are, for example, coupled via an oil passage using oil. The friction braking unit 7 generates the friction braking force according to a fluid pressure of the oil passage between the friction braking unit 7 and the friction brake controller 12.

The current sensor 9 measures the three-phase alternating currents iu, iv, and iw supplied from the inverter 3 to the motor 1. The current sensor 9 outputs the measured three-phase alternating currents iu, iv, and iw to the motor controller 14.

The rotation sensor 10 is, for example, a resolver and an encoder that detects a rotator phase α (rad), a phase of the rotator of the motor 1. The rotation sensor 10 outputs the detected rotator phase α to the motor controller 14.

The fluid pressure sensor 11 measures the fluid pressure of the friction braking unit 7.

The friction brake controller 12 obtains a fluid pressure command value from an input of a friction torque command value Tb* from the motor controller 14 to and a brake fluid pressure from the fluid pressure sensor 11. The friction brake controller 12 controls the fluid pressure of the oil passage between the friction braking unit 7 and the friction brake controller 12 according to the obtained fluid pressure command value.

The battery controller 13 monitors the state of the battery 2 to obtain a State Of Charge (SOC) (%) indicative of a remaining amount of the battery 2. The battery controller 13 obtains a regenerable electric power Pin (W) from the SOC of the battery 2 and the temperature. The battery controller 13 outputs the obtained regenerable electric power Pin to the motor controller 14. It should be noted that the regenerable electric power Pin becomes zero or a positive value. It should be noted that, instead of the SOC, a Depth Of Discharge (DOD) indicative of a ratio of the discharge relative to the capacity may be used.

To the motor controller 14, a vehicle speed V of the electric vehicle 100 from a vehicle speed sensor (not illustrated), an accelerator position (accelerator opening degree) θ from an accelerator position sensor (not illustrated), which measures a depression amount of the accelerator pedal, a direct-current voltage value Vdc from the voltage sensor 8, the three-phase alternating currents iu, iv, and iw from the current sensor 9, the rotator phase α of the motor 1 from the rotation sensor 10, the brake fluid pressure from the fluid pressure sensor 11, and the SOC and the regenerable electric power Pin from the battery controller 13 are input. The motor controller 14 outputs the PWM signals Tu, Tv, and Tw to the inverter 3 via a drive circuit on the basis of these inputs and outputs the friction torque command value Tb* to the friction brake controller 12. Detailed operations of the motor controller 14 will be described later. It should be noted that, taking the regenerative braking by the motor 1 and responsiveness of the friction braking by the friction braking unit 7 into consideration, the motor controller 14 controls the torque command value.

The following describes transfer functions in a vehicle model in which a drive transmission system of the electric vehicle 100 used in processes by the motor controller 14 is modeled. The transfer functions Gp(s), Gb(s), Gpa(s), and Gba(s) are used for the processes by the motor controller 14.

The transfer function Gp(s) indicates transfer characteristics from an input of a motor torque Tm generated by the motor 1 to an output of a motor rotation speed $\omega_m$ as the rotation speed of the motor 1.

The transfer function Gb(s) indicates transfer characteristics from an input of a friction torque Tb generated in the friction braking unit 7 to an output of the motor rotation speed $\omega_m$.

The transfer function Gpa(s) indicates transfer characteristics from the input of the motor torque Tm to an output of an acceleration $\alpha$ of the electric vehicle 100.

The transfer function Gba(s) indicates transfer characteristics from the input of the friction torque Tb to the output of the acceleration $\alpha$ of the electric vehicle 100.

Figure 2A:
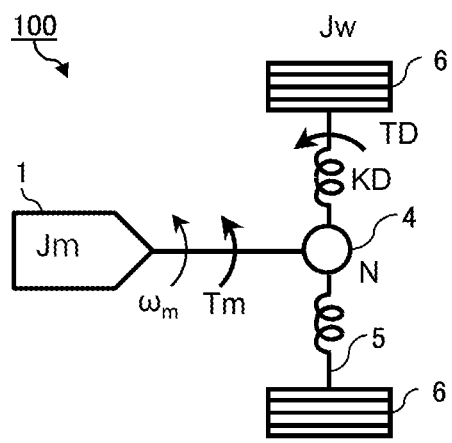
FIG. 2A is a view illustrating a vehicle model.
Figure 2B:
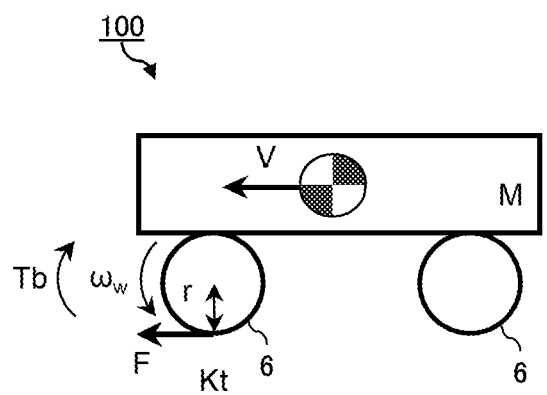
FIG. 2B is a view illustrating a vehicle model.

The following describes these transfer functions with reference to FIG. 2A and FIG. 2B.

FIG. 2A and FIG. 2B are views illustrating the vehicle model in which a drive force transmission system of the electric vehicle 100 is modeled.
Respective parameters in these views are as follows.
Jm: inertia of the motor 1
Jw: inertia of the driving wheels 6
M: weight of the electric vehicle 100
KD: torsional rigidity of the drive system
Kt: friction coefficient between tires and a road surface
N: overall gear ratio
r dynamic radius of tires
$\omega_m$: motor rotation speed of the motor 1
Tm: motor torque
TD: torque of the driving wheels 6
F: force applied to the electric vehicle 100
V: speed of the electric vehicle 100
$\omega_w$: angular velocity of the driving wheels 6
Tb: friction braking amount generated in the friction braking unit 7 (motor shaft conversion torque)

It should be noted that the following equations of motion of Equations (1) to (5) can be derived from FIG. 2A and FIG. 2B. The parameters with the asterisks (*) attached to the right upper in the following Equations (1) to (3) indicate that the parameters have time-differentiated values.

[Equation 1]

$$Jm \cdot \omega_m^* = Tm - TD/N \quad (1)$$

[Equation 2]

$$2Jw \cdot \omega_w^* = TD - rF - N \cdot Tb \quad (2)$$

[Equation 3]

$$M \cdot V^* F = F \quad (3)$$

[Equation 4]

$$TD = KD \cdot \int (\omega_m/N - \omega_w) dt \quad (4)$$

[Equation 5]

$$F = Kt(r \cdot \omega_w - V) \quad (5)$$

Here, with the angular velocity $\omega_w$ of the driving wheels 6 larger than zero ($\omega_w > 0$), that is, while the electric vehicle 100 moves forward, a friction braking amount Tb becomes positive (Tb>0). With the angular velocity $\omega_w$ of the driving wheels 6 smaller than zero ($\omega_w < 0$), that is, while the electric vehicle 100 goes in reverse, the friction braking amount Tb becomes negative (Tb<0). With the angular velocity $\omega_w$ of the driving wheels 6 of zero ($\omega_w = 0$) that is, while the electric vehicle 100 stops, the friction braking amount Tb becomes zero (Tb=0).

From the equations of motion of Equations (1) to (5), the transfer function Gp(s) is obtained as Equation (6). The transfer function Gb(s) is obtained as Equation (7).

[Equation 6]

$$G_p(s) = \frac{b_3 s^3 + b_2 s^2 + b_1 s + b_0}{s(a_4 s^3 + a_3 s^2 + a_2 s + a_1)} \quad (6)$$

[Equation 7]

$$G_b(s) = -\frac{b_1 s + b_0}{s(a_4 s^3 + a_3 s^2 + a_2 s + a_1)} \quad (7)$$

Note that, the respective parameters in Equations (6) and (7) are expressed as follows.

$$a_4 = 2Jm \cdot Jw \cdot M$$

$$a_3 = Jm(2Jw + Mr^2)Kt$$

$$a_2 = (Jm + 2Jw/N^2)M \cdot KD$$

$$a_1 = (Jm + 2Jw/N^2 + Mr^2/N^2)KD \cdot Kt$$

$$b_3 = 2Jw \cdot M$$

$$b_2 = (2Jw + Mr^2)Kt$$

$$b_1 = M \cdot KD$$

$$b_0 = KD \cdot Kt \qquad \text{[Equation 8]}$$

Through examinations, the poles and 0 points of the transfer function shown in Equation (6) can be approximated to a transfer function of the following Equation (6), and one pole and one 0 points indicate values extremely close to each other. This is equivalent to that $\alpha$ and $\beta$ of Equation (6) indicate values extremely close to each other.

[Equation 9]

$$G_p(s) = \frac{(s + \beta)(b_2' s^2 + b_1' s + b_0')}{s(s + \alpha)(a_3' s^2 + a_2' s + a_1')} \quad (8)$$

Therefore, by performing pole-zero cancellation (approximation to $\alpha = \beta$) in Equation (6), the transfer characteristics Gp(s) of (second order)/(third order) as shown in the following Equation (9) is constituted.

[Equation 10]

$$G_p(s) = \frac{(b_2' s^2 + b_1' s + b_0')}{s(a_3' s^2 + a_2' s + a_1')} \quad (9)$$

From the equations of motion of Equations (1) to (5), the transfer function Gpa(s) is obtained as Equation (10) and the transfer function Gba(s) is obtained as Equation (11).

[Equation 11]

$$G_{pa}(s) = \frac{b_{0a}}{a_4 s^3 + a_3 s^2 + a_2 s + a_1} \quad (10)$$

[Equation 12]

$$G_{ba}(s) = \frac{-(b_{2a} s^2 + b_{0a})}{a_4 s^3 + a_3 s^2 + a_2 s + a_1} \quad (11)$$

Note that, the respective parameters in Equations (10) and (11) are expressed by the following equation.

$$b_{2a} = Jm \cdot r \cdot Kt \cdot N$$

$$b_{0a} = r/N \cdot KD \cdot Kt \quad \text{[Equation 13]}$$

Thus, the transfer functions Gp(s), Gb(s), Gpa(s), and Gba(s) can be obtained.

The following describes the control by the motor controller 14.

Figure 3:
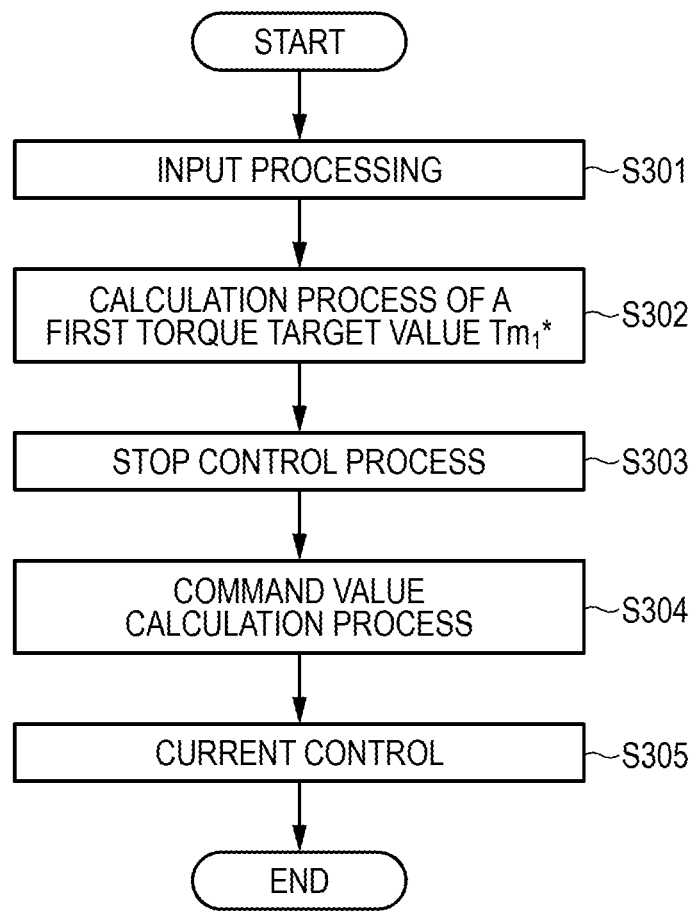
FIG. 3 is a flowchart illustrating running control of the electric vehicle.

FIG. 3 is a flowchart illustrating running control of the electric vehicle 100 by the motor controller 14. This running control is repeatedly performed at a predetermined timing.

At S301, an input processing to the motor controller 14 is performed. As illustrated in FIG. 1, to the motor controller 14, the direct-current voltage value Vdc (V), the regenerable electric power Pin (W), the friction braking amount Tb, the vehicle speed V (m/s), the accelerator position θ (%), the rotator phase α (rad), and the three-phase alternating currents iu, iv, and iw (A) are input.

The direct-current voltage value Vdc is input from the voltage sensor 8 to the motor controller 14.

The regenerable electric power Pin is input from the battery controller 13 to the motor controller 14. This regenerable electric power Pin having a value other than 0 indicates that the battery 2 has an available capacity. The regenerable electric power Pin becomes larger as the available capacity increases.

The rotator phase α is input from the rotation sensor 10 to the motor controller 14.

The accelerator position θ is input via communicating means from the accelerator position sensor or another controller. In this embodiment, it is assumed that the accelerator position θ is a value in increments of 1/4 (25%). That is, the accelerator position θ is expressed by five levels 0/4 (0%), 1/4 (25%), 2/4 (50%), 3/4 (75%), and 4/4 (100%). With the accelerator position θ of 0/4 (0%), the accelerator pedal is fully closed, that is, the accelerator pedal is not depressed at all. With the accelerator position θ of 4/4 (100%), the accelerator pedal is fully opened, that is, the accelerator pedal is fully depressed. It should be noted that the accelerator position θ is not the value in increments of 1/4 (25%) but, for example, may be a value in increments of 1%.

The three-phase alternating currents iu, iv, and iw are input from the current sensor 9 to the motor controller 14. It should be noted that, since the three-phase alternating currents iu, iv, and iw have a feature that the sum of them becomes 0, the current sensor 9 may detect currents of any given two phases and the motor controller 14 may obtain the current from the one remaining phase by operation.

The vehicle speed V is input from the vehicle speed sensor to the motor controller 14. The vehicle speed V may be input via the communicating means from another controller such as the friction brake controller 12.

The vehicle speed V may be obtained using the rotator phase α of the motor 1 measured by the rotation sensor 10. Specifically, differentiating the rotator phase α as the electric angle obtains the angular velocity c (rad/s) of the electric angle of the rotator of the motor 1. Dividing the angular velocity ca of the electric angle of the rotator by a pole pair number, which is the number of pairs of magnetic poles provided by the motor 1, obtains the motor rotation speed $\omega_m$ (rad/s) as a mechanical angle. Multiplying the motor rotation speed Cm by the dynamic radius r (m) of the driving wheels 6 and dividing the found value by the final gear ratio of the reduction gear 4 obtains a vehicle speed v (m/s). Then, multiplying the vehicle speed v (m/s) by a unit conversion coefficient (3600/1000) obtains the vehicle speed V (km/h). It should be noted that multiplying the motor rotation speed $\omega_m$ (rad/s) by the unit conversion coefficient (60/2π) can obtain a rotation speed Nm (rpm) of the motor 1.

At Step S302, the motor controller 14 performs a calculation process of a first torque target value $Tm_{1*}$. The first torque target value $Tm_{1*}$ is obtained from the accelerator operation by a driver and the current speed of the electric vehicle 100 and is a command value that causes the motor 1 to generate the torque at which the electric vehicle 100 becomes a desired speed. At S302, a torque table illustrated in FIG. 4 is used.

Figure 4:
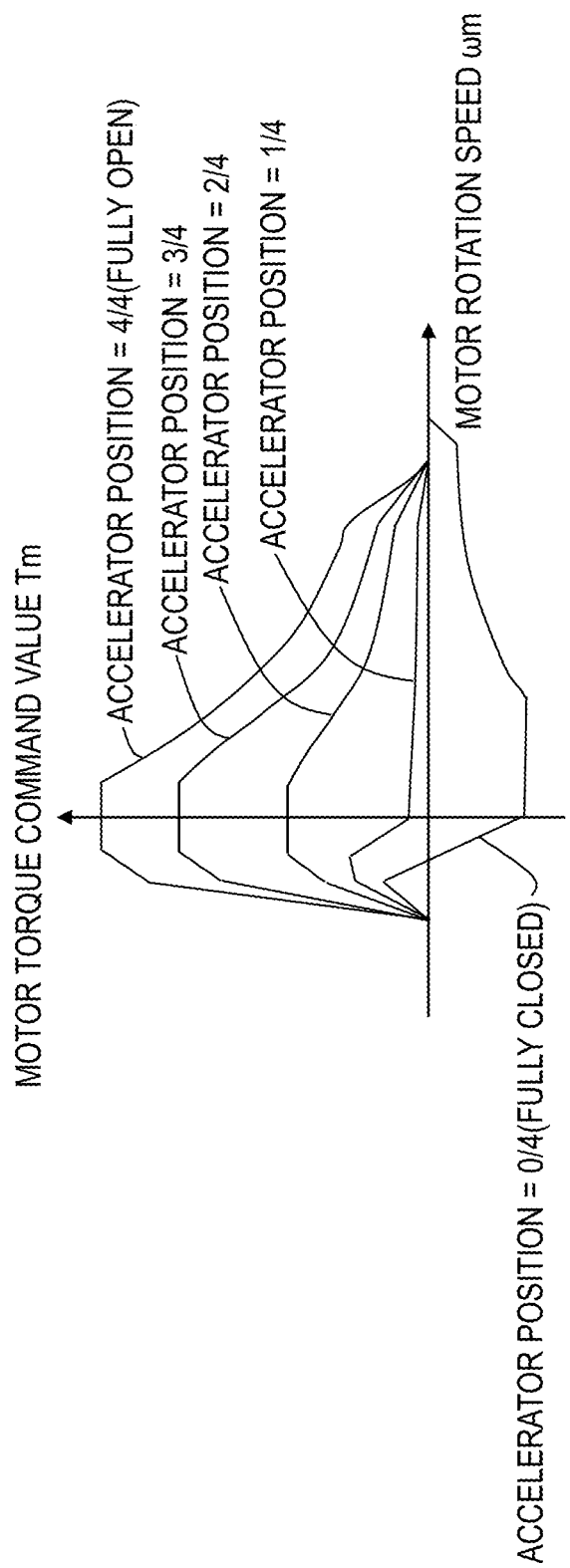
FIG. 4 is a view illustrating an exemplary torque table.

FIG. 4 is a view illustrating an exemplary torque table depending on the accelerator position. Using this torque table, the torque target value at which the desired speed is obtained is obtained from the motor rotation speed according to the running condition of the electric vehicle 100 and the accelerator position according to the operation by the driver. FIG. 4 illustrates the relationship between the motor rotation speed $\omega_m$ and the torque target value Tm in the respective cases of the accelerator position being 0/4 (0%), 1/4 (25%), 2/4 (50%), 3/4 (75%), and 4/4 (100%).

The motor controller 14 obtains the motor rotation speed $\omega_m$ by dividing the differentiated rotator phase α by the pole pair number. Using the torque table in FIG. 4, the motor controller 14 refers to the torque target value Tm with the accelerator position θ input at S301 and the obtained motor rotation speed $\omega_m$ to obtain the first torque target value $Tm_{1*}$.

It should be noted that since the electric vehicle 100 performs the acceleration and deceleration and the stop of the vehicle only by the operation of the accelerator pedal, the electric vehicle 100 decelerates with the fully closed accelerator pedal. It should be noted that, as described above, although there may be a case where the electric vehicle 100 includes the brake pedal, even if the brake pedal is not depressed, the electric vehicle 100 can decelerate and stop only by the operation of the accelerator pedal. Accordingly, in FIG. 4, with the accelerator position of 0/4 (fully closed), the negative value is mainly set to the torque target value Tm. It should be noted that the torque table may be another table other than FIG. 4.

Referring to FIG. 3 again, the following describes processes after S302.

At Step S303, the motor controller 14 performs a stop control process. At the stop control process, the motor controller 14 determines whether the electric vehicle 100 is just before stop of the vehicle. When the electric vehicle 100 is in before just before stop of the vehicle, the first torque target value $Tm_{1*}$ calculated at S302 is set to a third torque target value $Tm_{3*}$. When the electric vehicle 100 is in after just before stop of the vehicle, a second torque target value $Tm_{2*}$ converged to a disturbance torque estimated value Td determined by disturbance torque estimating means as the reduction in the motor rotation speed is set to the third torque target value $Tm_{3*}$. On the basis of the third torque target value $Tm_{3*}$, a motor torque command value Tm* and a friction torque command value Tb* are calculated. It should be noted that details of the stop control process will be described later with reference to FIG. 5 to 10.

At Step S304, the motor controller 14 uses the motor torque command value Tm* calculated at S303 to obtain the PWM signals Tu, Tv, and Tw output to the inverter 3. It should be noted that for the calculation of the PWM signals used to control the motor 1, a synchronous rotation coordinate constituted of a d-axis and a q-axis is used.

Specifically, the motor controller 14 uses the direct-current voltage value Vdc input at S301, the motor rotation speed $\omega_m$ obtained at S302, and the motor torque command value Tm* calculated at S303 to obtain a d-axis current target value id* and a q-axis current target value iq* indicated by the synchronous rotation coordinate as the current target value supplied to the motor 1.

It should be noted that the motor controller 14 preliminary stores a table showing the relationship between the direct-current voltage value Vdc, the motor rotation speed $\omega_m$, and the motor torque command value Tm*, and the d-axis current target value id* and the q-axis current target value iq*. Referring to this table, the motor controller 14 can obtain the d-axis current target value id* and the q-axis current target value iq* from the direct-current voltage value Vdc, the motor rotation speed Wm, and the motor torque command value $T_m$*.

At Step S305, the motor controller 14 uses the d-axis current target value id* and the q-axis current target value iq* obtained at S304 to obtain the PWM signals Tu, Tv, and Tw. The motor controller 14 outputs the PWM signals Tu, Tv, and Tw to the inverter 3 and outputs the friction torque command value Tb* obtained at S303 to the friction brake controller 12. The following describes a process that the motor controller 14 obtains the PWM signals Tu, Tv, and Tw in detail.

First, the motor controller 14 converts the three-phase alternating current iu, iv, and iw input at S301 into current d-axis current amount id and q-axis current amount iq on the basis of the rotator phase α of the motor 1. The motor controller 14 obtains a d-axis voltage command value vd from a deviation between the d-axis current target value id* and the d-axis current amount id and obtains a q-axis voltage command value vq from a deviation between the q-axis current target value iq* and the q-axis current amount iq.

The motor controller 14 obtains three-phase alternating current voltage command values vu, vv, and vw from the d-axis voltage command value vd, the q-axis voltage command value vq, and the rotator phase α of the motor 1. The motor controller 14 calculates the PWM signals Tu (%), Tv (%), and Tw (%) from the obtained three-phase alternating current voltage command values vu, vv, and vw and the direct-current voltage value Vdc.

The following describes details of the stop control process shown in S303 in FIG. 3 with reference to FIG. 5 to FIG. 10.

Figure 5:
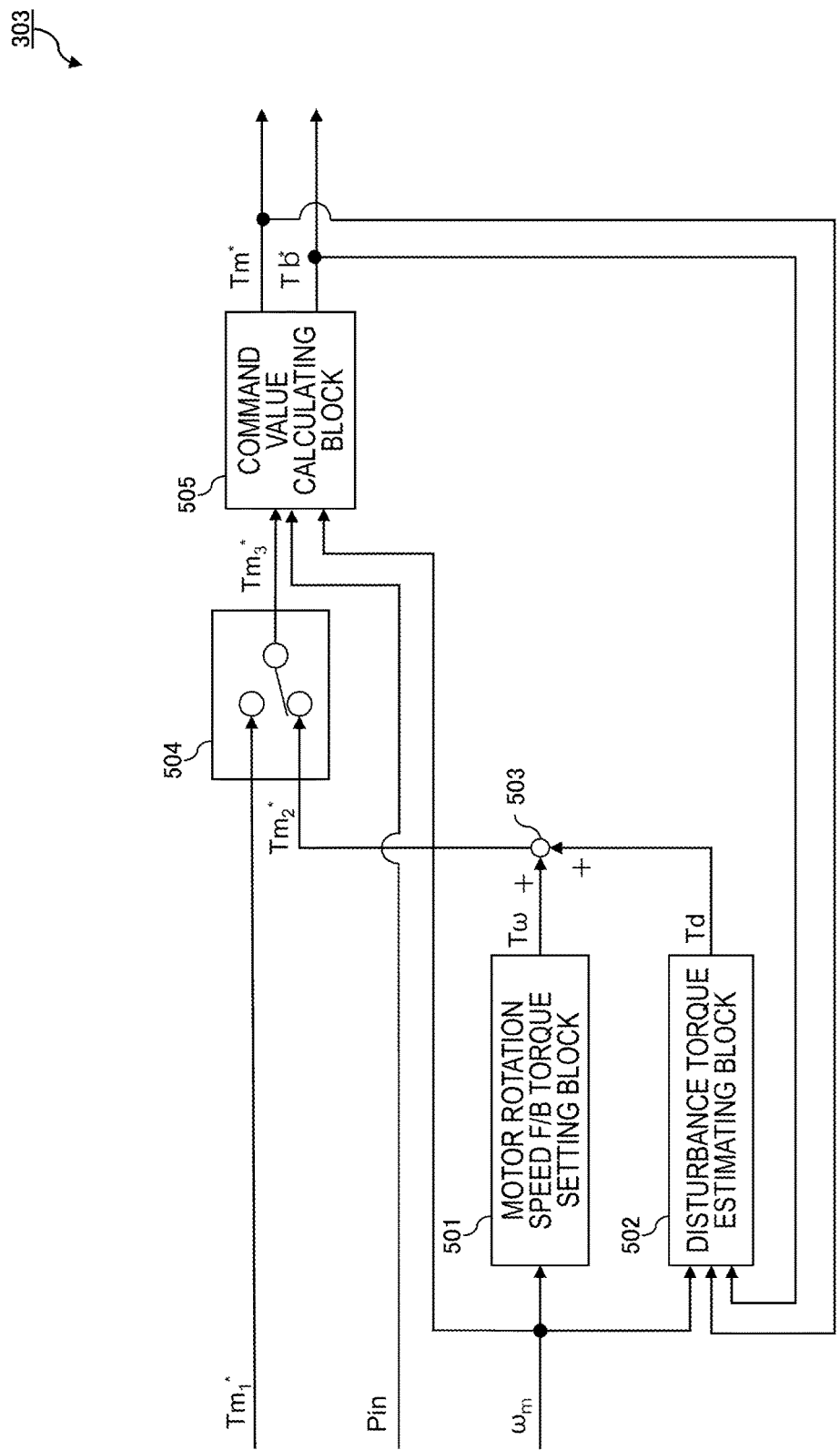
FIG. 5 is a block diagram illustrating a stop control process.

FIG. 5 is a block diagram to describe the stop control process at S303 in FIG. 3.

As illustrated in FIG. 5, the stop control process performed by the motor controller 14 performs processes by a motor rotation speed F/B torque setting block 501, a disturbance torque estimating block 502, an adder 503, a comparator 504, and a command value calculating block 505.

In the motor rotation speed F/B torque setting block 501, the motor rotation speed $\omega_m$ calculated at S301 in FIG. 3 is input, and a motor rotation speed F/B torque Tω is output to the adder 503. The detailed process in the motor rotation speed F/B torque setting block 501 will be described later with reference to FIG. 6.

To the disturbance torque estimating block 502, the motor rotation speed $\omega_m$ and the motor torque command value Tm* and the friction torque command value Tb*, which are feed-back inputs from the command value calculating block 505, are input. In the disturbance torque estimating block 502, the disturbance torque estimated value Td is estimated using these inputs and the vehicle model. The disturbance torque estimating block 502 outputs the disturbance torque estimated value Td to the adder 503. It should be noted that the detailed process in the disturbance torque estimating block 502 will be described later with reference to FIG. 7.

The adder 503 adds the motor rotation speed F/B torque Tω output from the motor rotation speed F/B torque setting block 501 to the disturbance torque estimated value Td output from the disturbance torque estimating block 502 to calculate the second torque target value $Tm_{2*}$. The adder 503 outputs the second torque target value $Tm_2$ to the comparator 504.

The comparator 504 compares magnitudes of the first torque target value $Tm_{1*}$ calculated at S302 in FIG. 3 with the second torque target value $Tm_{2*}$ output from the adder 503. The comparator 504 outputs the larger value among the first torque target value $Tm_{1*}$ and the second torque target value $Tm_{2*}$ to the command value calculating block 505 as the third torque target value $Tm_{3*}$.

The command value calculating block 505 performs a command value calculation control. The command value calculating block 505 obtains the motor torque command value Tm* and the friction torque command value Tb* from the motor rotation speed $\omega_m$ and the inputs of the third torque target value $Tm_{3*}$ from the comparator 504 and the regenerable electric power Pin from the battery controller 13 and outputs the values. The detailed process of the command value calculation control in the command value calculating block 505 will be described later with reference to FIG. 8.

Figure 6:
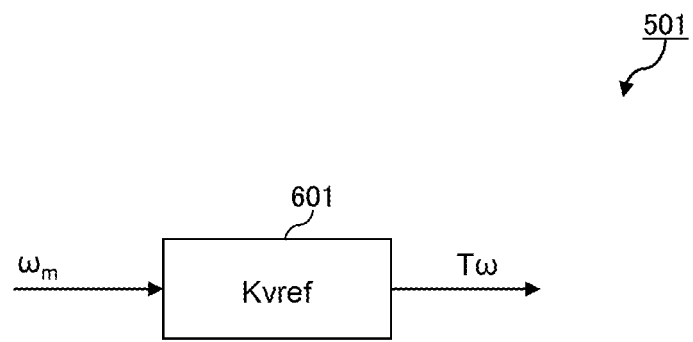
FIG. 6 is a block diagram illustrating a process in a motor rotation speed F/B torque setting block.

The following describes the detail of the process in the motor rotation speed F/B torque setting block 501 illustrated in FIG. 5 with reference to FIG. 6.

FIG. 6 is a block diagram illustrating a process in the motor rotation speed F/B torque setting block 501. The motor rotation speed F/B torque setting block 501 is constituted of a multiplier 601 and outputs a result of multiplying the input of the motor rotation speed $\omega_m$ by a gain Kvref as the motor rotation speed F/B torque Tω.

It should be noted that a negative value is set to Kvref such that the electric vehicle 100 decelerates or stops while the accelerator pedal is fully closed (the accelerator position θ is 0%). Accordingly, as long as the motor rotation speed $\omega_m$ has a large positive value, the motor rotation speed F/B torque Tω becomes s large negative value and therefore the braking force increases. It should be noted that the specific Kvref value is set on the basis of, for example, experimental data.

With this embodiment, while the motor rotation speed F/B torque setting block 501 multiplies the motor rotation speed $\omega_m$ by the gain Kvref to calculate the motor rotation speed F/B torque Tω, the method is not limited to this. The motor rotation speed F/B torque setting block 501 may use a regenerative torque table in which the motor rotation speeds $\omega_m$ are made to correspond to the regenerative torques, an attenuation rate table indicative of attenuation rates of the motor rotation speed $\omega_m$, or a similar table to calculate the motor rotation speed F/B torque Tω.

Figure 7:
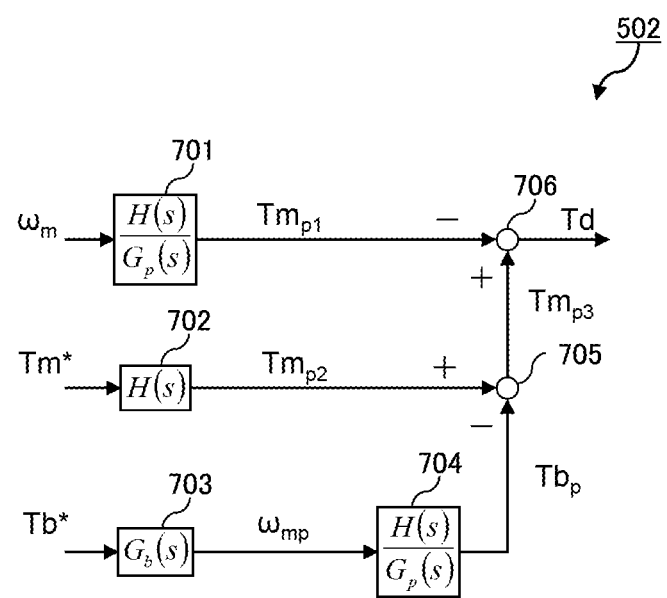
FIG. 7 is a block diagram illustrating a process in a disturbance torque estimating block.

The following describes the detail of the process by the disturbance torque estimating block 502 illustrated in FIG. 5 with reference to FIG. 7.

FIG. 7 is a block diagram illustrating the process in the disturbance torque estimating block 502. In the disturbance torque estimating block 502, the motor rotation speed $\omega_m$, the motor torque command value Tm*, and the friction torque command value Tb* are input, and the disturbance torque estimated value Td is output.

The disturbance torque estimating block 502 includes blocks 701 to 704 and subtractors 705 and 706.

In the block 701, a filtering process is performed on the motor rotation speed $\omega_m$ by H(s)/Gp(s) using a low-pass filter H(s). The low-pass filter H(s) has a difference between the denominator degree and the numerator degree equal to or more than a difference between the denominator degree and the numerator degree of the model Gp(s) for the transfer characteristics of the motor torque Tm and the motor rotation speed $\omega_m$ to calculate a first motor torque estimated value $Tm_{p1}$.

In the block 702, the filtering process is performed on the motor torque command value Tm* by the low-pass filter H(s) to calculate a second motor torque estimated value $Tm_{p2}$.

In the block 703, the filtering process is performed on the friction torque command value Tb* in the transfer function Gb(s) from the friction braking amount Tb until the motor rotation speed $\omega_m$ to calculate a friction rotation speed estimated value $\omega_{mp}$.

In the block 704, similar to the block 701, the filtering process is performed on a friction rotation speed $\omega_{mp}$ by H(s)/Gp(s) to calculate a friction torque estimated value $Tb_p$.

The subtractor 705 subtracts the friction torque estimated value $Tb_p$ output from the block 704 from the second motor torque estimated value $Tm_{p2}$ output from the block 702 to obtain a third motor torque estimated value $Tm_{p3}$. The subtractor 705 outputs the third motor torque estimated value $Tm_{p3}$ to the subtractor 706.

The subtractor 706 subtracts the first motor torque estimated value $Tm_{p1}$ output from the block 701 from the third motor torque estimated value $Tm_{p3}$ output from the subtractor 705 to calculate the disturbance torque estimated value Td and output the disturbance torque estimated value Td.

It should be noted that while this embodiment estimates the disturbance torque by a disturbance observer as illustrated in FIG. 7, the disturbance torque may be estimated using a measuring instrument such as a vehicle longitudinal G sensor.

While an air resistance, a modeling error caused by a variation of a vehicle weight (the number of passengers and a load capacity), a rolling resistance of the tires, a gradient resistance, and a similar resistance are thought as the disturbances targeted by the embodiment, a disturbance factor dominant in just before stop of the vehicle is the gradient resistance. While the disturbance factors differ depending on driving conditions, the disturbance factors described above can be collectively estimated since the disturbance torque estimating block 502 calculates the disturbance torque estimated value Td on the basis of the motor torque command value Tm*, the motor rotation speed $\omega_m$, the vehicle models Gp(s) and Gb(s), and the friction torque command value Tb*. This achieves a smooth vehicle stop from deceleration without variation under any driving condition.

The following describes the operation of the comparator 504 when the electric vehicle 100 stops where the disturbance torque estimated value Td becomes a part of the input with reference to FIG. 5. To the comparator 504, the first torque target value $Tm_{1*}$ and the second torque target value $Tm_{2*}$ are input.

Here, when the electric vehicle 100 stops, the first torque target value $Tm_{1*}$ becomes the negative value. This is because that, in the torque table of FIG. 4, when the electric vehicle 100 stops, that is, when the accelerator position θ is zero and the motor rotation speed $\omega_m$ becomes comparatively small, the first torque target value $Tm_{1*}$ is a negative value.

Referring to FIG. 5 again, when the electric vehicle 100 stops, the second torque target value $Tm_{2*}$ converges to a predetermined value according to the gradient. This is because that, when the electric vehicle 100 stops, the converge of the motor rotation speed $\omega_m$ to zero converges the motor rotation speed F/B torque Tω output from the motor rotation speed F/B torque setting block 501 as the multiplier to zero and the disturbance torque estimated value Td output from the disturbance torque estimating block 502 becomes an approximately constant predetermined value according to the gradient.

In the vehicle stop state, the converge value of the second torque target value $Tm_{2*}$ is larger than the constant negative value of the first torque target value $Tm_{1*}$. Therefore, until the electric vehicle 100 stops, the second torque target value $Tm_{2*}$ becomes larger than the first torque target value $Tm_{1*}$. Therefore, by regarding the state of the second torque target value $Tm_{2*}$ becoming larger than the first torque target value $Tm_{1*}$ as the state where the electric vehicle 100 is just before stop of the vehicle, switching of the processes according to whether the electric vehicle 100 is just before stop of the vehicle or not can be performed using the comparator 504.

As described above, in the case where the second torque target value $Tm_{2*}$ becomes larger than the first torque target value $Tm_{1*}$, that is, when the electric vehicle 100 is regarded as in the state just before stop of the vehicle, the comparator 504 outputs the second torque target value $Tm_{2*}$. The second torque target value $Tm_{2*}$ converges to the predetermined value with which the influence from the gradient can be reduced. Accordingly, since the motor 1 reduces the rotation speed while being controlled such that the influence from the gradient is reduced, the electric vehicle 100 can be smoothly stopped.

Furthermore, the second torque target value $Tm_{2*}$, which is used for the control of the motor 1 while the electric vehicle 100 stops, is mainly a value to reduce the influence from the gradient. The second torque target value $Tm_{2*}$ becomes a positive torque on uphill roads, becomes a negative torque on downhill roads, and becomes an approximately zero on flat roads. Accordingly, since the motor 1 is controlled such that the influence from the gradient is reduced, the vehicle stop state can be maintained at places with gradient without the use of the brake pedal.

Figure 8:
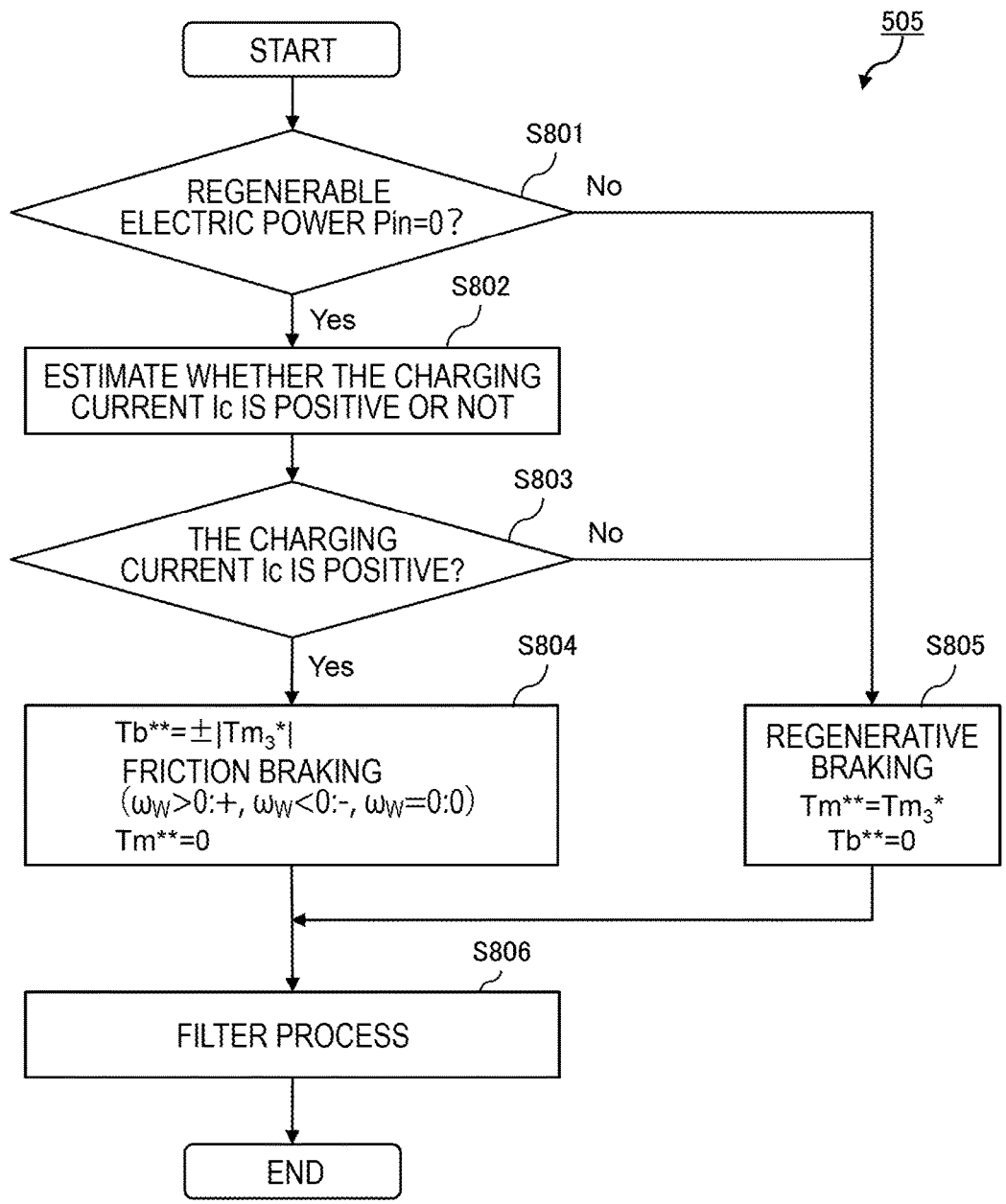
FIG. 8 is a flowchart illustrating a command value calculation control.

Next, the following describes details of the command value calculation control performed in the command value calculating block 505 illustrated in FIG. 5 with reference to FIG. 8.

FIG. 8 is a flowchart illustrating the command value calculation control. FIG. 8 illustrates processes S801 to S806 in the command value calculation control. In these processes, the braking method is selected at S801 and S803 and command values are obtained at S804 to S806.

At Step S801, the motor controller 14 determines whether the battery 2 can be regenerated by determining whether the regenerable electric power Pin transmitted from the battery controller 13 is zero or not. That is, when the regenerable electric power Pin is zero, (S801: Yes), the motor controller 14 determines that the battery 2 is possibly overcharged if the regenerative braking is performed, and advances the process to S802. On the other hand, when the regenerable electric power Pin is not zero (S801: No), since the battery 2 has the available capacity, the motor controller 14 determines that the battery 2 is appropriately charged even if the regenerative braking is performed and selects the regenerative braking to advance the process to S805.

At Step S802, the motor controller 14 calculates a charging current Ic using the third torque target value $Tm_{3*}$ output from the comparator 504 in FIG. 5 and the motor rotation speed $\omega_m$ calculated at S301 in FIG. 3.

Here, the charging current Ic is a current that flows to the battery 2 when the regenerative braking is performed. That is, when all the regenerative electric power of the motor 1 is consumed by the electric vehicle 100, the charging current Ic becomes negative. The charging current Ic becomes negative just before stop of the vehicle, which is a state where the vehicle speed decreases such that all the regenerative electric power of the motor 1 becomes equal to or less than a power consumption consumed by the electric vehicle 100. On the other hand, when the regenerative electric power of the motor 1 is not entirely consumed by the electric vehicle 100 but is charged to the battery 2, the charging current Ic becomes positive. That is, the sign of the charging current Ic indicates a magnitude relationship between the regenerative electric power of the motor 1 and the power consumption of the electric vehicle 100. It should be noted that the regenerative electric power means an electric power generated in the motor 1. The power consumption means an electric power consumed by a rotatable drive in the motor 1 and an electric power consumed in the inverter 3 and other electric equipment.

Figure 9:
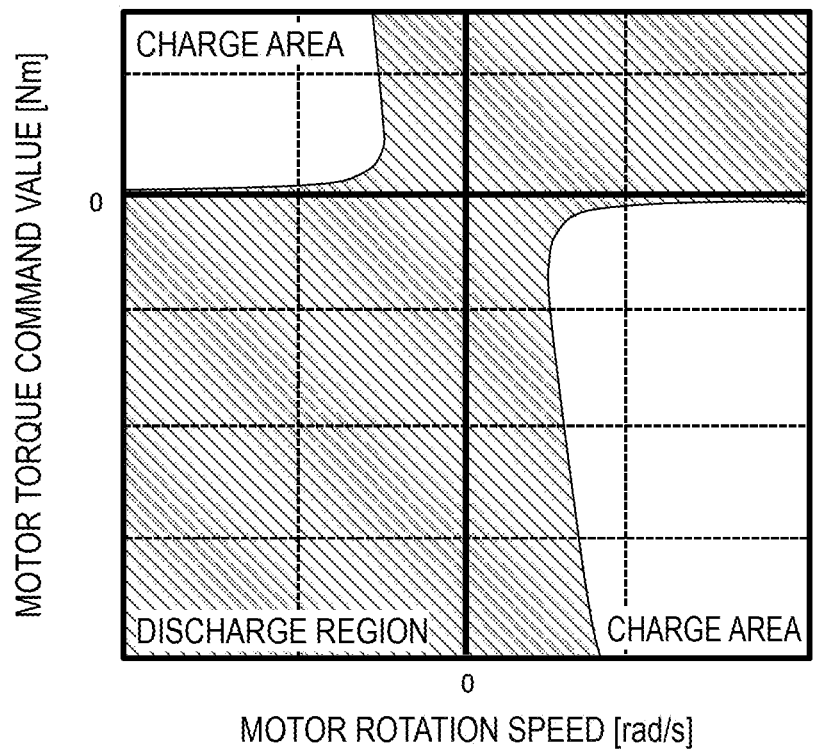
FIG. 9 is a view illustrating an exemplary charging current table.

FIG. 9 is a charging current table illustrating whether the charging current Ic is positive or not corresponding to the motor torque command value Tm* and the motor rotation speed $\omega_m$. It should be noted that in FIG. 9, a horizontal axis indicates the motor rotation speed $\omega_m$ and a vertical axis indicates the motor torque command value Tm*. It should be noted that the third torque target value $Tm_{3*}$ used at S802 is equivalent to the motor torque command value Tm*.

FIG. 9 illustrates whether the battery 2 is charged or discharged when driving and regenerating in accordance with the motor torque command value Tm* are performed in a state where the motor 1 rotates at the motor rotation speed $\omega_m$. Here, the motor rotation speed $\omega_m$ indicates the running condition of the electric vehicle 100, and the motor torque command value Tm* is obtained according to the accelerator position. In addition to the magnitude relationship between the regenerative electric power and the power consumption, whether the battery 2 is charged or discharged is determined by whether the regenerable electric power Pin is zero or not. Accordingly, FIG. 9 illustrates a predicted result of the magnitude relationship between the regenerative electric power and the power consumption on the basis of the accelerator position and the running condition of the electric vehicle 100.

Specifically, in FIG. 9, the hatched region is a discharge region and the regions without the hatching are charge regions. When the regenerative braking is performed in the discharge region, it is predicted that the regenerative electric power by the motor 1 falls below the power consumption of the electric vehicle 100 and the battery 2 is discharged. Accordingly, the charging current Ic becomes negative. On the other hand, when the regenerative braking is performed in the charge region, it is predicted that the regenerative electric power by the motor 1 exceeds the power consumption of the electric vehicle 100 and the battery 2 is charged. Accordingly, the charging current Ic becomes positive. It should be noted that when a position referred in FIG. 9 is a boundary between the discharge region and the charge region, the charging current Ic is zero.

With reference to FIG. 8 again, the motor controller 14 determines whether the charging current Ic calculated at S802 is positive or not at Step S803. When the charging current Ic is positive (S803: Yes), performing the regenerative braking causes the regenerative electric power to exceed the power consumption, resulting in overcharge of the battery 2. Therefore, the motor controller 14 determines that the regenerative braking cannot be performed and selects the friction braking to advance the process to S804. On the other hand, when the charging current Ic is not positive (S803: No), the regenerative electric power becomes equal to or less than the power consumption even when the regenerative braking is performed. Therefore, the motor controller 14 determines that the regenerative braking can be performed and selects the regenerative braking to advance the process to S805.

It should be noted that, as a modification of S802 and S803, the motor controller 14 may determine whether the charging current Ic is positive or negative by determining whether the position referred by the third torque target value $Tm_{3*}$ and the motor rotation speed $\omega_m$ in FIG. 9 is the charge region or the discharge region or not.

At Step S804, the motor controller 14 sets a motor torque command value (before the filter process) Tm and the friction torque command value (before the filter process) Tb used in the friction braking.

Specifically, the motor torque command value (before the filter process) Tm* is set to 0. An absolute value of the third motor torque target value Tm3* to which the sign identical to the sign of the angular velocity $\omega_w$ of the driving wheels 6 is attached is set as the friction torque command value (before the filter process) Tb. That is, when the angular velocity $\omega_w$ of the driving wheels 6 is positive ($\omega_w>0$), that is, when the electric vehicle 100 moves forward, the friction torque command value (before the filter process) Tb becomes positive. When the angular velocity $\omega_w$ of the driving wheels 6 is negative ($\omega_w<0$), that is, when the electric vehicle 100 moves backward, the friction torque command value (before the filter process) Tb becomes negative. When the angular velocity $\omega_w$ of the driving wheel 6 is zero ($\omega_w=0$), that is, when the electric vehicle 100 stops, no friction braking is performed. Thus, the sign of the friction torque command value (before the filter process) Tb becomes zero.

On the other hand, at Step S805, the motor controller 14 sets the third torque target value $Tm_{3*}$ as the motor torque command value (before the filter process) Tm and sets zero as the friction torque command value (before the filter process) Tb.

At Step S806, the motor controller 14 performs the filter process on the motor torque command value (before the filter process) Tm and the friction torque command value (before the filter process) Tb to calculate the motor torque command value Tm* and the friction torque command value Tb*. The following describes the details of the filter process at 3806 with reference to FIG. 10.

Figure 10:
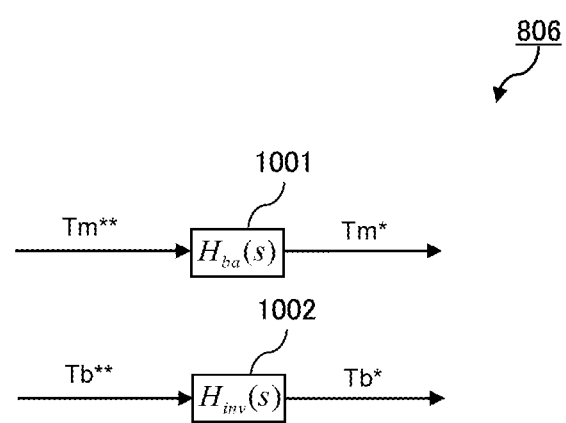
FIG. 10 is a block diagram illustrating a filter process.

FIG. 10 is a block diagram illustrating the filter process at S806 illustrated in FIG. 8.

As illustrated in FIG. 10, the command value calculating block 505 includes blocks 1001 and 1002.

The block 1001 is a filter Hba(s) that performs the filter process on the input motor torque command value (before the filter process) Tm** and outputs the motor torque command value Tm*. It should be noted that the filter Hba(s) is expressed by the following Equation.

[Equation 14]

$$H_{ba}(s) = \frac{G_{ba}(s) \cdot H_{brk}(s)}{G_{pa}(s)} \quad (12)$$

It should be noted that a filter Hbrk(s) in the Equation (12) is expressed by the following equation.

[Equation 15]

$$H_{brk}(s) = \frac{\omega_b^2}{(s^2 + 2 \cdot \omega_b \cdot s + \omega_b^2)} \quad (13)$$

Note that a parameter in Equation (13) is as follows. $\omega_b$: unique vibration frequency when an actuator response in the friction braking unit 7 is expressed by the second order vibration system.

The filter Hba(s) is a product of a transfer function Gba(s), 1/Gpa(s) as an inverse transfer function of Gpa(s), and a filter Hbk(s). Therefore, the output of the acceleration α of the electric vehicle 100 is obtained from the input of the motor torque command value (before the filter process) Tm** with the transfer function Gba(s). Furthermore, the acceleration α becomes the input, and the driving torque of the motor 1 is obtained with the inverse transfer function 1/Gpa(s). Then, the filter Hbrk(s) performs the filter process appropriate for the friction braking to obtain the motor torque command value Tm*.

The block 1002 is a filter Hinv(s) that performs the filter process on the input friction torque command value (before the filter process) Tb** and outputs the friction torque command value Tb*. It should be noted that the filter Hinv(s) is expressed by the following.

[Equation 16]

$$H_{inv}(s) = \frac{(s^2 + 2\zeta_p \cdot \omega_p \cdot s + \omega_p^2)}{(s^2 + 2 \cdot \omega_p \cdot s + \omega_p^2)} \quad (14)$$

Note that, parameters in Equation (14) are as follows.
$\omega_p$: unique vibration frequency in the vehicle model
$\zeta_p$: damping coefficient in the vehicle model Use of such filter Hba(s) of the block 1001 and filter Hinv(s) of the block 1002 ensures uniforming responsiveness of the acceleration from the motor torque and responsiveness of the acceleration from the friction braking amount.

Here, as the friction braking unit 7 is hydraulic braking of slow responsiveness while the responsiveness of the motor 1 is almost instant, there is a difference in the responsiveness between the regenerative braking and the friction braking. Accordingly, for example, as is the case of when the regenerative braking and the friction braking are switched, even when the motor torque command value (before the filter process) Tm and the friction torque command value (before the filter process) Tb as the input values rapidly change, performing the filtering process in the blocks 1001 and 1002 takes the difference in the responsiveness between the hydraulic braking and the regenerative braking into consideration in the motor torque command value Tm* and the friction torque command value Tb* as the output values.

Thus, in the filter process at S806, the use of the blocks 1001 and 1002 reduces the rapid change of the command value to the motor 1 and the friction braking unit 7. Specifically, in the motor torque command value Tm* as the command value to the motor 1, the rapid variation is reduced such that the slow response of the friction braking unit 7 is compensated. Therefore, a difference between the command value and the response value in the friction braking unit 7 caused due to the slow responsiveness in the friction braking unit 7 is compensated by the motor 1.

Figure 11:
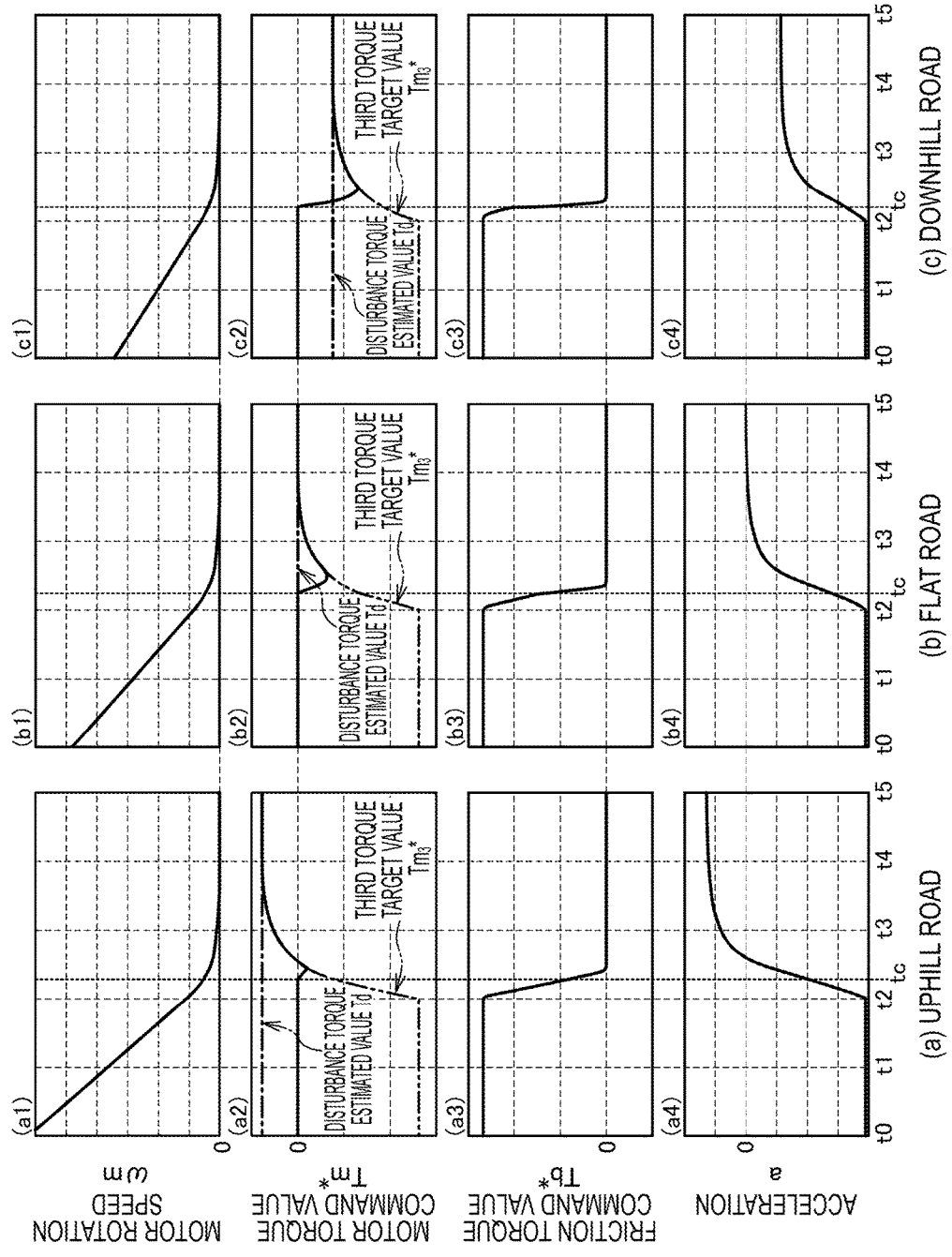
FIG. 11 is timing charts illustrating exemplary running conditions of the electric vehicle.

The following describes the running conditions of the electric vehicle 100 with reference to FIG. 11.

FIG. 11 is views illustrating the running conditions of the electric vehicle 100. FIG. 11 illustrates the running conditions of the electric vehicle 100 when the regenerable electric power Pin is zero and switching from the friction braking to the regenerative braking is performed (a time tc) after the electric vehicle 100 enters a state of just before stop of the vehicle (a time t2).

FIG. 11 illustrates the running conditions of the electric vehicle 100 on (a) the uphill road, (b) the flat road, and (c) the downhill road. FIG. 11 illustrates the motor rotation speed $\omega_m$ in (a1), (b1), and (c1) on the uppermost stage. In (a2), (b2), and (c2) on the second stage from the top, the motor torque command value Tm* is illustrated in solid lines, the disturbance torque estimated value Td is illustrated in one-dot chain lines, and the third torque target value $Tm_{3*}$ is illustrated in two-dot chain lines. In (a3), (b3), and (c3) on the third stage from the top, the friction torque command value Tb* is illustrated. In (a4), (b4), and (c4) on the lowermost stage, the acceleration α of the electric vehicle 100 is illustrated.

Figure 12:
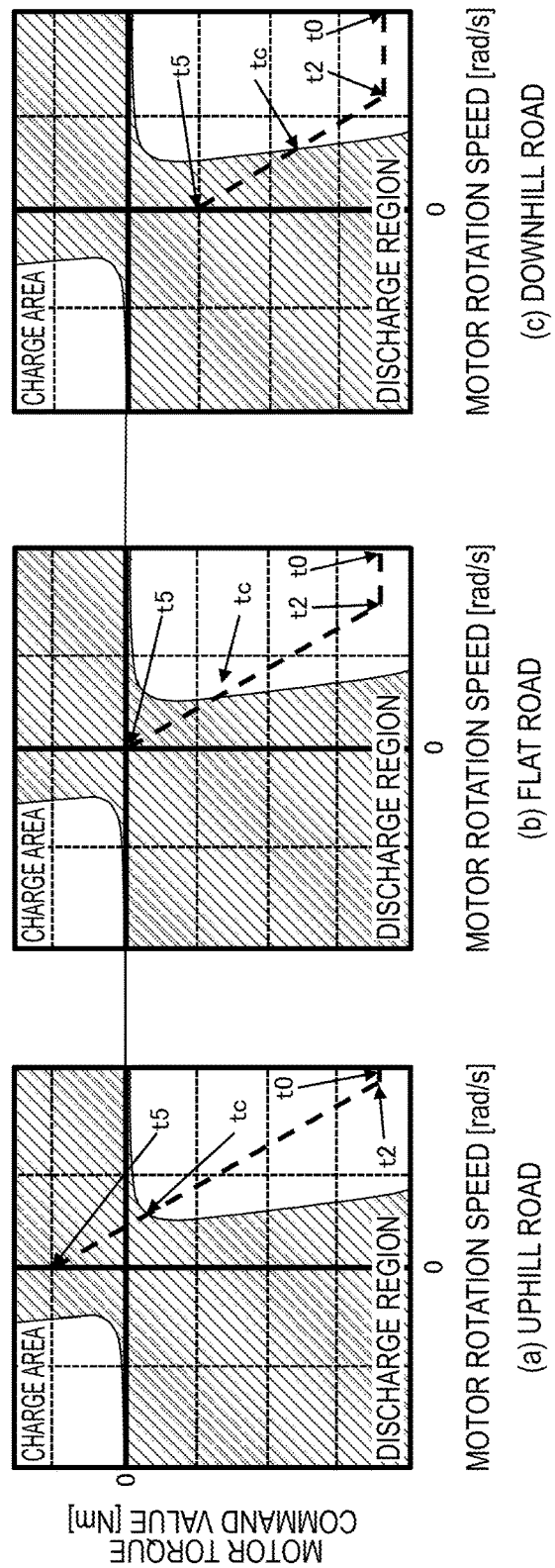
FIG. 12 is charging current tables illustrating operations of the electric vehicle in the timing charts in FIG. 11.

FIG. 12 is charging current tables illustrating the running conditions of the electric vehicle 100 in FIG. 11. FIG. 12 indicates changes in the charging current Ic until the electric vehicle 100 stops when the electric vehicle 100 runs on the respective (a) uphill road, (b) flat road, and (c) downhill road by dotted lines.

First, the following describes the running conditions of the electric vehicle 100 at each time in FIG. 11.

At a time t0, the accelerator position θ is 0 and the electric vehicle 100 starts decelerating by the friction braking. At the time t2, the electric vehicle 100 is in the state of just before stop of the vehicle and switches the state to the braking using the disturbance torque estimated value Td. At the time tc between the time t2 and a time t5, the braking method switches from the friction braking to the regenerative braking. At the time t5, the electric vehicle 100 stops.

Here, the following describes the running condition of the electric vehicle 100 at the time t0 at which the deceleration by the friction braking is started on the uphill road.

With reference to FIG. 11 (a1), at the time t0, the electric vehicle 100 is in a state before the just before stop of the vehicle. The speed of the electric vehicle 100 monotonically decreases, thus monotonically reducing the motor rotation speed $\omega_m$.

With reference to FIG. 11 (a2), at the time t0, since the influence from the gradient of the road surface is dominant, the disturbance torque estimated value Td is a positive value according to the gradient of the uphill road. It should be noted that the disturbance torque estimated value Td is mostly the identical value since the influence from the gradient of the road surface is dominant even at a time other than the time t0.

The third torque target value Tm$_{3*}$ is a predetermined negative value. This can be described as follows.

The comparator 504 illustrated in FIG. 5 outputs the first torque target value Tm$_{1*}$ as the third torque target value Tm$_{3*}$ since the electric vehicle 100 is not in the state of just before stop of the vehicle. Here, with reference to the torque table in FIG. 4, when the electric vehicle 100 is in the state of just before stop of the vehicle, that is, when the accelerator position θ is zero and the motor rotation speed ω$_m$ is small, the first torque target value Tm$_1$* is a constant negative value. Accordingly, the third torque target value Tm$_3$* becomes the first torque target value Tm$_1$* as the constant negative value.

The motor torque command value Tm* is zero. This can be described as follows.

With reference to the command value calculation process in FIG. 8, the regenerable electric power Pin is zero (S801: Yes), and the charging current Ic with the positive value is calculated at the process at S802. Therefore, the friction braking is selected (S803: No), and the motor torque command value (before the filter process) Tm becomes zero (S804). It should be noted that the motor torque command value (before the filter process) Tm is not varied. Therefore, the motor torque command value Tm* through the block 1001 in FIG. 10 also becomes zero (S806).

With reference to FIG. 11 (a3), at the time t0, the friction torque command value Tb* is set to an absolute value of the third torque target value Tm$_3$* illustrated in FIG. 11 (a2) with a positive sign. This is because, since the friction braking is performed as described above, the command value calculation process in FIG. 8 sets the friction torque command value Tb* to a value according to the third torque target value Tm$_3$* at 8804.

With reference to FIG. 11 (a4), at the time t0, since the motor rotation speed ω$_m$ monotonically decreases as illustrated in FIG. 11 (a1), the acceleration α is constant at a negative value.

The following describes the running condition of the electric vehicle 100 at the time t2 at which the electric vehicle 100 is in the state of just before stop of the vehicle on the uphill road.

With reference to FIG. 11 (a1), at the time t2, since the electric vehicle 100 is in the state of just before stop of the vehicle and switches to the motor rotation speed F/B control, a decreasing gradient of the motor rotation speed ω$_m$ decreases.

With reference to FIG. 11 (a2), at the time t2, the third torque target value Tm$_3$* significantly changes. This is caused by the magnitude relationship between the first torque target value Tm$_1$* and the torque target value Tm$_2$* being reversed before and after the time t2 since the electric vehicle 100 enters the state of just before stop of the vehicle. That is, the third torque target value Tm$_3$* output from the comparator 504 in FIG. 5 is the first torque target value Tm$_1$* before the time t2 and is the second torque target value Tm$_2$* after the time t2. It should be noted that, at the time t2, the first torque target value Tm$_1$* and the second torque target value Tm$_2$* are identical values. Therefore, the comparator 504 in FIG. 5 outputs any of the first torque target value Tm$_1$* and the second torque target value Tm$_2$* as the third torque target value Tm$_3$*.

After the time t2, the third torque target value Tm$_3$* as the second torque target value Tm$_2$* converges to the disturbance torque estimated value Td. This is because, with reference to FIG. 5, as the motor rotation speed F/B torque Tω output from the motor rotation speed F/B torque setting block 501 decreases in association with the decrease of the motor rotation speed ω$_m$, the second torque target value Tm$_2$* output from the adder 503 converges to the disturbance torque estimated value Td output from the disturbance torque estimating block 502.

The motor torque command value Tm* is zero. This is because, similar to the time t0, the regenerable electric power is zero (S801: Yes) in the command value calculation process illustrated in FIG. 8 and the charging current Ic at the time t2 is positive in FIG. 12 (a) (S803: Yes); therefore, the friction braking is performed (S804, S806).

With reference to FIG. 11 (a3), at the time t2, the friction torque command value Tb* is an absolute value of the third torque target value Tm$_3$* in FIG. 11 (a2) with a positive sign, since the friction braking is performed as described above. It should be noted that, after the time t2, the friction torque command value Tb* decreases in association with the increase of the third torque target value Tm$_3$*. It should be noted that, at the time t2, the change in the friction torque command value Tb* is gentler than the change in the third torque target value Tm$_3$*. This is because the variation is reduced by the process of the block 1002 in FIG. 10 at 8806 in FIG. 8.

With reference to FIG. 11 (a4), at and after the time t2, the electric vehicle 100 is in the state of just before stop of the vehicle. Therefore, the acceleration α gradually increases from the negative value due to the decreasing gradient of the motor rotation speed ω$_m$ starting to be small as illustrated in FIG. 11 (a2).

Next, the following describes the running condition of the electric vehicle 100 at the time tc at which the braking method switches from the friction braking to the regenerative braking on the uphill road.

With reference to FIG. 11 (a1), at the time tc, the motor rotation speed ω$_m$ is a value close to zero. This is because, as described above, the motor rotation speed ω$_m$ converges to zero after the time t2 at which the electric vehicle 100 is in the state of just before stop of the vehicle.

With reference to FIG. 11 (a2), at the time tc, the third torque target value Tm$_3$* is a value close to the disturbance torque estimated value Td. This is because, as described above, the third torque target value Tm$_3$* converges to the disturbance torque estimated value Td after the time t2 at which the electric vehicle 100 is in the state of just before stop of the vehicle.

The motor torque command value Tm* is zero at the time tc and converges to the third torque target value Tm$_3$* with the lapse of time after the time tc. This is because the motor controller 14 performs the following operation.

With reference to the command value calculation process illustrated in FIG. 8, before the time tc, the regenerable electric power is zero (S801: Yes), the positive charging current Ic is calculated (S802), the friction braking is selected (S803: Yes), the motor torque command value (before the filter process) Tm is set to zero (S804). On the other hand, at the time tc, the regenerable electric power is zero (S801: Yes), the charging current Ic of zero is calculated (S802), the regenerative braking is selected (S803: No), and the motor torque command value (before the filter process) Tm is set to the third torque target value Tm$_3$* (S05).

Accordingly, the motor torque command value (before the filter process) Tm** is set to zero before the time tc (S804) and is set to the third torque target value Tm$_3$* at and after the time tc (S805). Therefore, the motor torque command value (before the filter process) Tm** rapidly varies.

However, performing the process of the block 1001 in FIG. 10 at S806 reduces the variation in the motor torque command value Tm* after the filter process. Therefore, the motor torque command value Tm* that is zero at the time tc converges to the third torque target value Tm₃* with the lapse of time.

It should be noted that, at the block 1001, as illustrated in Equation (12), the delay of the responsiveness of the friction braking unit 7 is taken into consideration. Therefore, the change in the motor torque command value Tm* is reduced such that an excess amount of the friction braking torque caused by the delay of the responsiveness by the friction braking unit 7 is compensated. In view of this, the friction torque amount caused by the slow responsiveness of the friction braking unit 7 is compensated by the driving force of the motor 1 when the braking method is switched from the friction braking to the regenerative braking.

With reference to FIG. 11 (a3), the friction torque command value Tb* is a value found by performing the filter process on the absolute value of the third torque target value Tm₃* with a positive sign at the time tc, and converges to zero with the lapse of time after the time tc. Such change in the friction torque command value Tb* can be described as follows.

As described above, in the command value calculation process in FIG. 8, the friction braking is performed before the time tc (S804), and the regenerative braking is performed at and after the time tc (S805).

Accordingly, the friction torque command value (before the filter process) Tb** is set to an absolute value of the third torque target value Tm₃* with a positive sign before the time tc (S804), and is set to zero at and after the time tc (S805). Therefore, the friction torque command value (before the filter process) Tb** rapidly changes.

However, performing the process of the block 1002 in FIG. 10 at S806 reduces the variation of the friction torque command value Tb* after the filter process. Therefore, the friction torque command value Tb* as a value found by performing the filter process on the third torque target value Tm3* converges to zero with the lapse of time.

With reference to FIG. 11 (a4), the decreasing gradient of the motor rotation speed $\omega_m$ decreases as illustrated in FIG. 11 (a1) at the time tc. Therefore, the change in the acceleration α gradually decreases.

The following describes the running condition of the electric vehicle 100 at the time t5 at which the electric vehicle 100 stops on the uphill road.

With reference to FIG. 11 (a1), the electric vehicle 100 stops at the time t5. Therefore, the motor rotation speed $\omega_m$ is zero.

With reference to FIG. 11 (a2), the motor torque command value Tm* matches the third torque target value Tm3* at the time t5. This is because the motor 1 generates the torque (S805 and S806) since, as described above, after the time tc, in the command value calculation process illustrated in FIG. 8, the regenerable electric power is zero (S801: Yes), and the charging current Ic calculated at S802 is negative at the time t5 (S803: No). This prevents the electric vehicle 100 from rolling down on the uphill road by the motor 1 generating the torque.

As described above, the third torque target value Tm3* converges to the disturbance torque estimated value Td at and after the time t2. Therefore, the motor torque command value Tm* matches the disturbance torque estimated value Td corresponding to the gradient when the electric vehicle 100 stops at the time t5. Accordingly, the motor 1 generating the positive driving torque that reduces the influence of the gradient ensures the electric vehicle 100 keeping the vehicle stop state on the uphill road.

With reference to FIG. 11 (a3), at the time t5, the regenerative braking is selected in the target value calculation process in FIG. 8 (S803: No); therefore, the friction torque command value Tb* becomes zero (S805 and S806).

With reference to FIG. 11 (a4), at the time t5, the acceleration α becomes a positive value such that the electric vehicle 100 keeps the vehicle stop state on the uphill road. This is because, as illustrated in FIG. 11 (a2), at the time t5, the motor 1 generates the driving torque in accordance with the motor torque command value Tm*, which is the disturbance torque estimated value Td.

Thus, on (a) the uphill road, the above-described processes are performed at the respective times. It should be noted that, on (b) the flat road and (c) the downhill road, the control sequence identical to that of on (a) the uphill road is performed.

However, in the cases of on (b) the flat road and (c) the downhill road, the disturbance torque estimated value Td calculated in the disturbance torque estimating block 502 in FIG. 5 is different from the case of on (a) the uphill road. The disturbance torque estimated value Td is a value corresponding to the gradient. With reference to FIG. 11 (b2), the disturbance torque estimated value Td becomes zero on (b) the flat road. With reference to FIG. 11 (c2), the disturbance torque estimated value Td becomes negative on (c) the downhill road.

Figure 13:
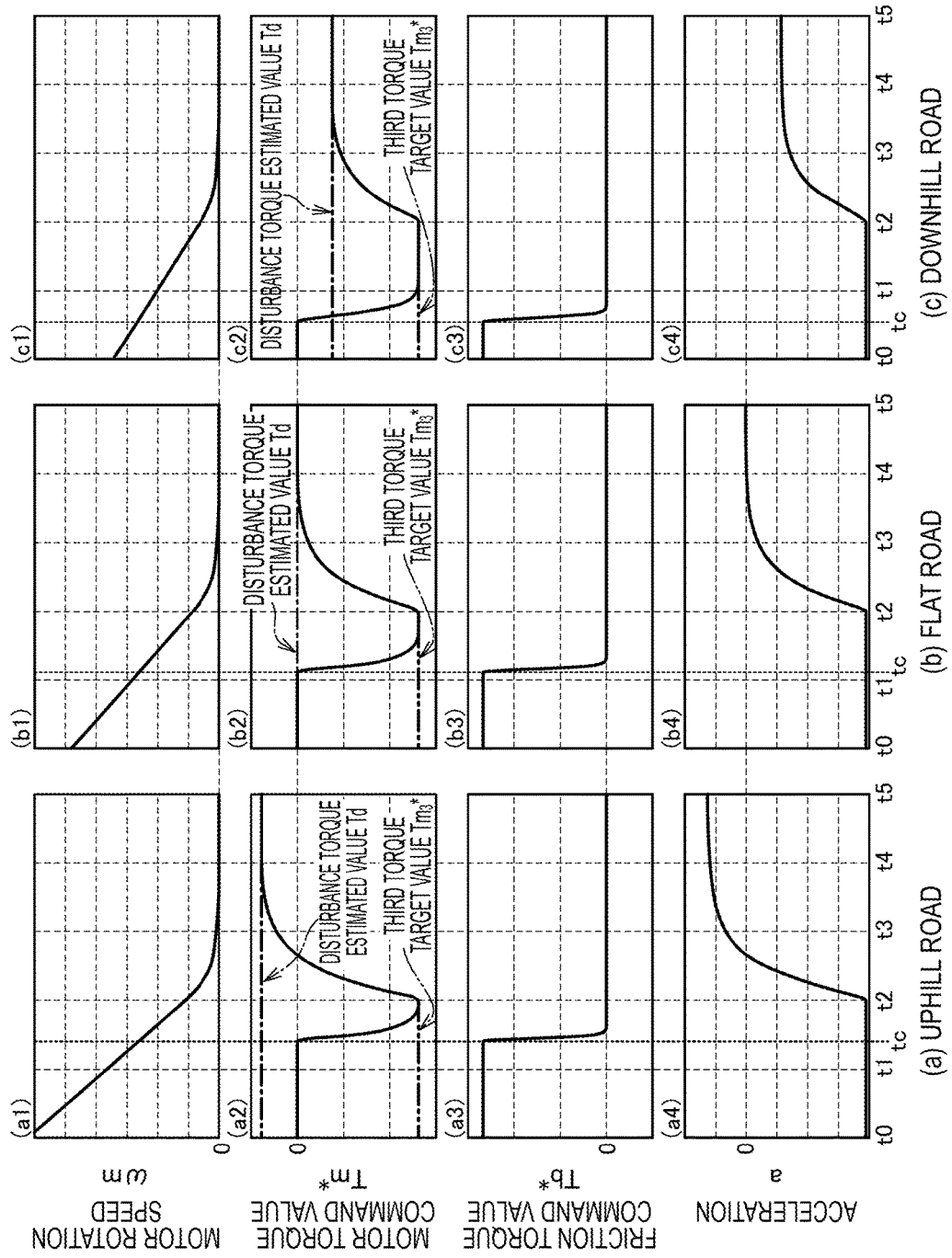
FIG. 13 is timing charts illustrating other exemplary running conditions of the electric vehicle.

Next, with reference to FIG. 13, the following describes other operations of the electric vehicle 100.

FIG. 13 is views illustrating the running conditions of the electric vehicle 100. Compared with FIG. 11, FIG. 13 is identical in that the regenerable electric power Pin is zero and is different in that the switching from friction braking to the regenerative braking is performed (the time tc) before the electric vehicle 100 enters a state of just before stop of the vehicle (the time t2).

It should be noted that FIG. 13 illustrates the cases of (a) the uphill road, (b) the flat road, and (c) the downhill road similar to FIG. 11. In each of (a) the uphill road, (b) the flat road, and (c) the downhill road, the motor rotation speed or, the motor torque command value Tm*, the friction torque command value Tb*, and the acceleration α are illustrated in an order from the top.

Figure 14:
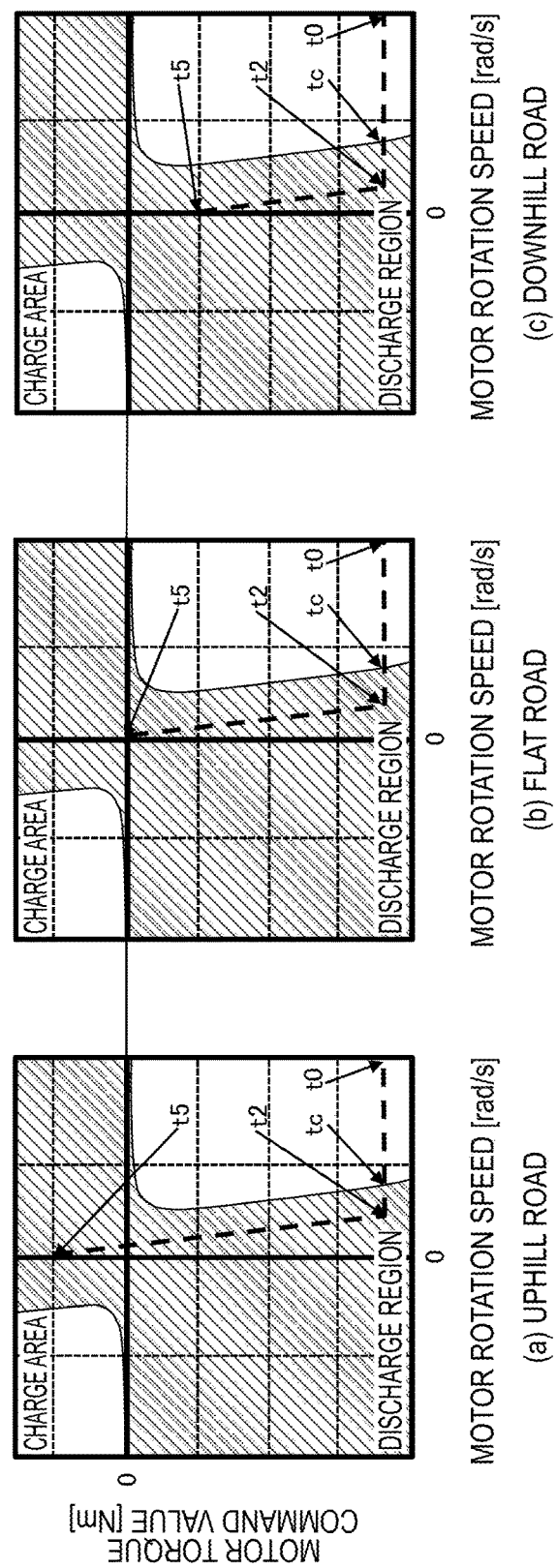
FIG. 14 is charging current tables illustrating operations of the electric vehicle in the timing charts in FIG. 13.

FIG. 14 is a charging current table illustrating the running conditions of the electric vehicle 100 in FIG. 13. FIG. 14, similar to FIG. 12, illustrates when the electric vehicle 100 runs on each of (a) the uphill road, (b) the flat road, and (c) the downhill road.

Next, the following describes operations of the electric vehicle 100 at the respective times in FIG. 13.

As described above, compared with FIG. 11, FIG. 13 is different in that the electric vehicle 100 enters the state of just before stop of the vehicle (the time t2) after the switching from the friction braking to the regenerative braking is performed (the time tc). Therefore, the following describes the operations of the electric vehicle 100 at the times tc and t2, and the descriptions of the other times are omitted.

First, the operation of the electric vehicle 100 at the time tc at which the braking method is switched from the friction braking to the regenerative braking on the uphill road.

With reference to FIG. 13 (a1), at the time tc, the motor rotation speed $\omega_m$ monotonically decreases and a decreasing pace is not changed. This is because before and after the time tc, only the switching of the braking method is performed, and the braking force generated in the electric vehicle 100 is not changed.

Describing in details, with reference to the command value calculation process in FIG. 8, the regenerable electric power is zero before the time tc (S801: Yes), the positive charging current Ic is calculated (S802), and the friction braking is selected (S803: Yes). Then, the friction torque command value Tb* becomes a value found by performing the filter process on the third torque target value $Tm_3$* (S804 and S806).

On the other hand, at the time tc, the regenerable electric power is zero (S801: Yes), the charging current Ic of zero is calculated (S802), and the regenerative braking is selected (S803: No). Then, the motor torque command value Tm* becomes the value found by performing the filter process on the third torque target value $Tm_3$* (S805 and S806).

That is, before the time tc, the friction braking on the basis of the third torque target value $Tm_3$* is performed, and at and after the time tc, the braking method is gradually switched to the regenerative braking on the basis of the third torque target value $Tm_3$*. Accordingly, before and after the time tc, while the braking methods are different, the braking force generated in the electric vehicle 100 does not change. Accordingly, at the time tc, the decreasing gradient of the motor rotation speed $\omega_m$ does not change.

With reference to FIG. 13 (a2), at the time tc, the third torque target value $Tm_3$* is a predetermined negative value similar to the time t0.

The motor torque command value Tm* is zero at the time tc, and converges to the third torque target value $Tm_3$* with the lapse of time after the time tc.

Such changes of the third torque target value $Tm_3$* and the motor torque command value Tm* are similar to the changes of the third torque target value $Tm_3$* and the motor torque command value Tm* at the time tc in FIG. 11 (a2) described above. Therefore, employing the description in FIG. 11 (a2) can make a description.

With reference to FIG. 13 (a3), the friction torque command value Tb* is a value found by attaching a negative sign to the third torque target value $Tm_3$* at the time tc, and converges to zero with the lapse of time after the time tc.

Such change of the friction torque command value Tb* is similar to the change of the friction torque command value Tb* at the time tc in FIG. 11 (a3) as described above. Therefore, employing the description in FIG. 11 (a3) can make a description.

With reference to FIG. 13 (a4), at the time tc, as illustrated in FIG. 13 (a1), the motor rotation speed $\omega_m$ monotonically decreases. Therefore, the acceleration α is a constant negative value.

Next, the following describes the operation of the electric vehicle 100 at the time t2 at which the electric vehicle 100 enters the state of just before stop of the vehicle on the uphill road.

With reference to FIG. 13 (a1), at the time t2, the electric vehicle 100 enters the state of just before stop of the vehicle. Therefore, the decreasing pace of the motor rotation speed $\omega_m$ starts to slow down so as to stop smoothly.

With reference to FIG. 13 (a2), the motor torque command value Tm* matches the third torque target value $Tm_3$*. This is because, in the command value calculation process illustrated in FIG. 8, the regenerable electric power is zero (S801: Yes), the negative charging current Ic is calculated at 3802 (S802), the regenerative braking is selected (S803: No), and the motor torque command value Tm* becomes a value corresponding to the third torque target value $Tm_3$* (S805 and S806).

With reference to FIG. 13 (a3), at the time t2, the regenerative braking is performed. Therefore, the friction torque command value Tb* becomes zero (S805 and S806).

With reference to FIG. 13 (a4), at the time t2, the electric vehicle 100 entering the state of just before stop of the vehicle decreases the decreasing gradient of the motor rotation speed $\omega_m$ as illustrated in FIG. 13 (a1). Therefore, the acceleration α gradually increases from the negative value.

It should be noted that while on (a) the uphill road, the above-described processes are performed at the respective times, the identical operations are performed at the identical timing to (a) the uphill road as well as on (b) the flat road and (c) the downhill road. It should be noted that the disturbance torque estimated value Td is a value caused by the gradient. As illustrated in FIG. 13 (b2), the disturbance torque estimated value Td is zero on (b) the flat road. As illustrated in FIG. 13 (c2), the disturbance torque estimated value Td is negative on (c) the downhill road.

It should be noted that the motor controller 14 may predict a value of the charging current Ic using an equation that modeled the regenerative electric power of the motor 1 and the power consumption of the electric vehicle 100.

The first embodiment provides the following effects.

The vehicle that executes driving and braking of the motor corresponding to the opening degree of the accelerator pedal needs to stop by adjusting the braking force corresponding to the disturbance. However, in this embodiment, just before stop of the vehicle, the regenerative braking, which is excellent in the controllability (such as a control responsiveness and a control accuracy) with respect to the friction braking, is executed to appropriately perform the braking corresponding to the disturbance. Therefore, the electric vehicle 100 can be stopped smoothly.

The control device of the electric vehicle in the first embodiment includes the motor 1, the friction braking unit 7, and the motor controller 14. The motor 1 generates the driving force or the regenerative braking force of the electric vehicle 100. The friction braking unit 7 generates the friction braking force. The motor controller 14 controls at least one of the motor 1 and the friction braking unit 7 corresponding to the opening degree of the accelerator pedal.

Here, with reference to the command value calculation process in FIG. 8, the motor controller 14 calculates the charging current Ic that flows toward the battery 2 when the regenerative braking is performed (S802), and determines positive or negative of the calculated charging current Ic (S803). When the regenerative electric power generated by the motor 1 exceeds the power consumption in the electric vehicle 100 when the braking force is generated by the motor 1 alone, the charging current Ic becomes positive. On the other hand, when the regenerative electric power generated by the motor 1 falls below the power consumption in the electric vehicle 100, the charging current Ic becomes negative. Accordingly, determining positive or negative of the charging current Ic (S803) ensures determining whether all the regenerative electric power generated by the motor 1 is consumed in the electric vehicle 100 or not when the braking force is generated by the motor 1 alone.

When the regenerable electric power Pin is zero (S801: Yes), the battery 2 is possibly overcharged if the regenerative braking is performed. However, even when the regenerable electric power Pin is zero, when the charging current Ic that flows toward the battery 2 when the regenerative braking is performed is calculated to be negative, that is, when all the regenerative electric power of the motor 1 is consumed by the motor 1 and the inverter 3 in the electric vehicle 100 (S803: No), the battery 2 is not charged even if the regenerative braking is performed. Therefore, even if the regenerable electric power Pin is in a state of zero, the motor controller 14 selects the regenerative braking (S805), and causes the motor 1 to perform the regenerative braking.

Here, immediately before the electric vehicle 100 stops, since the vehicle speed is close to zero, the regenerative electric power of the motor 1 is small. Therefore, all the regenerative electric power is consumed in the electric vehicle 100, thus, the battery 2 discharges and the charging current Ic becomes negative. Thus, immediately before the electric vehicle 100 stops, the charging current Ic is constantly negative (S803: No), thereby ensuring performing the regenerative braking. Accordingly, the electric vehicle 100 can be stopped by the regenerative braking (S805) regardless of how much the remaining amount of the battery 2 is. Therefore, the acceleration vibration when the electric vehicle 100 is stopped can be reduced, and the electric vehicle 100 can be smoothly decelerated to stop.

As a modification of S802 and S803 executed by the motor controller 14 as the control device in the first embodiment, the motor controller 14 may determine positive or negative of the charging current Ic using the charging current table in FIG. 9. The charging current table illustrates positive or negative of the charging current Ic on the basis of the motor torque command value corresponding to the operation of the accelerator and the motor rotation speed $\omega_m$ corresponding to the running condition of the electric vehicle 100. Thus, only by the motor torque command value Tm* and the motor rotation speed $\omega_m$, positive or negative of the charging current Ic can be determined, thereby ensuring decreasing a load of arithmetic processing in the motor controller 14.

It should be noted that, with reference to the charging current table in FIG. 9, when the motor rotation speed $\omega_m$ is a value at the proximity of zero, that is, when the electric vehicle 100 is in the state of immediately before stop, since it is in the discharge region regardless of the magnitude of the motor torque command value Tc, the charging current Ic is negative.

Thus, in the state of immediately before the electric vehicle 100 stops, since the charging current Ic is negative (S803: No), the motor controller 14 causes the motor 1 to perform the regenerative braking (S805). Accordingly, the electric vehicle 100 can be stopped by the regenerative braking regardless of how much the remaining amount of the battery 2 is. Therefore, causing the motor 1 to perform the regenerative braking when the charging current Ic is determined to be negative using the charging current table ensures smoothly decelerating and stopping the electric vehicle 100.

With the motor controller 14 that is the control device of the first embodiment, with reference to the command value calculation process in FIG. 8, at S806, the filter process is performed on the motor torque command value (before the filter process) Tm and the friction torque command value (before the filter process) Tb that are obtained at S804 or S805, thus obtaining the motor torque command value Tm* and the friction torque command value Tb*.

In this filter process, the use of the filter Hba(s) of the block 1001 and the filter Hinv(s) of the block 1002 ensures uniforming the responsiveness of the acceleration from the motor torque and the responsiveness of the acceleration from the friction braking amount.

Accordingly, by the use of the block 1001, the responsiveness of the friction braking unit 7 slower than the responsiveness of the motor 1 is considered. Thus, the regenerative braking force by the motor 1 is reduced so as to compensate the delay of this responsiveness.

Here, by using the operation of the electric vehicle 100 at the time when transition is performed from the charge area to the discharge region in the charging current table in FIG. 9, that is, the time tc in FIG. 11 to 14, the effect by the above-described filter process by the block 1001 will be described. At this time tc, in the command value calculation process in FIG. 8, the motor controller 14 performs switching from the friction braking (S804) to the regenerative braking (S805).

At this time tc, the friction torque command value (before the filter process) Tb** that will be the command value to the friction braking unit 7 significantly changes from a value on the basis of the third torque target value $Tm_3$ (S04) to zero (S805). Therefore, at the time tc, it is preferable that the friction braking torque by the friction braking unit 7 becomes zero. However, the friction braking torque by the friction braking unit 7 becomes a value greater than the command value due to the slow responsiveness in the friction braking unit 7.

In contrast, the motor torque command value (before the filter process) Tm** that will be the command value to the motor 1 significantly changes from zero (S804) to the third torque target value $Tm_3$ (S805). Here, at the block 1001 in FIG. 10 in the filter process at 3806, that is, at the motor torque command value Tm* after the process in Equation (12), the slow responsiveness in the friction braking unit 7 is taken into consideration to reduce the variation.

Therefore, when the variation of the motor torque command value Tm* output from the block 1001 is reduced, the control is performed to generate the driving torque in the motor 1 so as to compensate the friction braking force due to the slow responsiveness generated in the friction braking unit 7. Accordingly, when the switching from the friction braking to the regenerative braking at the time tc is performed, accelerated vibration and variation due to the slow responsiveness in the friction braking unit 7 can be reduced.

With the motor controller 14 that is the control device of the first embodiment, with reference to the stop control process in FIG. 5, at the disturbance torque estimating block 502, the disturbance torque estimated value Td necessary for the electric vehicle to hold the vehicle stop state corresponding to the disturbance that acts on the electric vehicle 100 is obtained using the vehicle model. Then, when the electric vehicle 100 is in the state of just before stop of the vehicle, the motor torque command value Tm output from the adder 503 becomes a sum of the motor rotation speed F/B torque T$\omega$ output from the motor rotation speed F/B torque setting block 501 and the disturbance torque estimated value Td output from the disturbance torque estimating block 502.

Here, when the electric vehicle 100 is in the state of just before stop of the vehicle, the motor rotation speed F/B torque T$\omega$ output from the motor rotation speed F/B torque setting block 501 converges to zero. Accordingly, the motor torque command value Tm* converges to the disturbance torque estimated value Td to converge the torque generated in the motor 1 to the value corresponding to the gradient. Thus, the electric vehicle 100 can be smoothly stopped. Furthermore, when the electric vehicle 100 stops, the motor 1 generates the torque corresponding to influence of the disturbance such as the gradient that acts on the electric vehicle 100. Thus, even at the position having the gradient, the vehicle stop state can be maintained without using the brake pedal.

Second Embodiment

The following describes a control device of a second embodiment. This embodiment describes a case where a timing that the braking method switches from the friction braking to the regenerative braking is different from that in the first embodiment.

Figure 15:
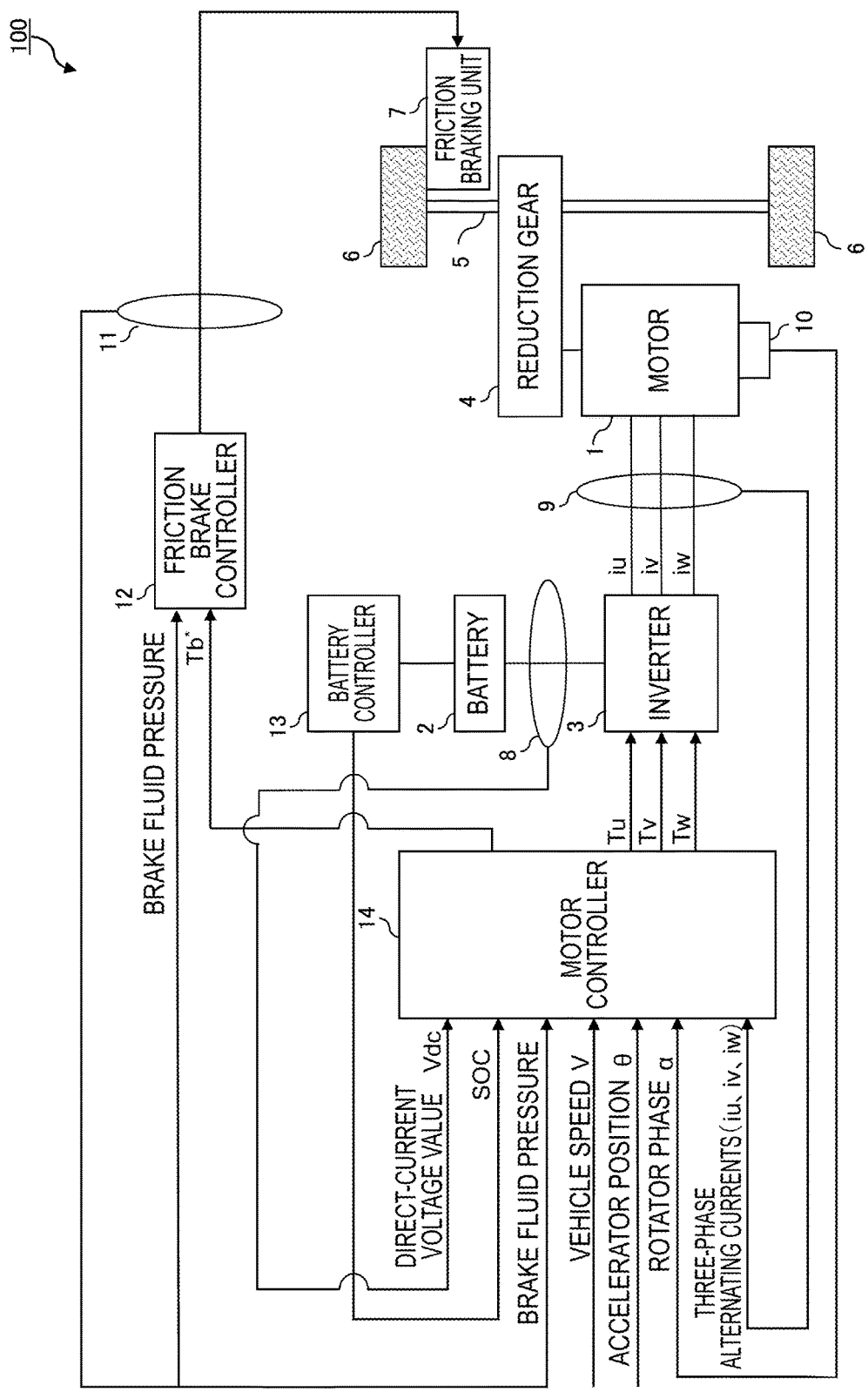
FIG. 15 is a schematic configuration diagram of an electric vehicle including a motor controller of a second embodiment.

FIG. 15 is a configuration diagram of an electric vehicle 100 including a motor controller 14 as the control device of the second embodiment.

With reference to FIG. 15, the electric vehicle 100 of the second embodiment is different from the electric vehicle 100 of the first embodiment illustrated in FIG. 1, in that the regenerable electric power Pin is not output from the battery controller 13 to the motor controller 14.

The motor controller 14 preliminarily stores an SOC specified value (SOC0) used for obtaining a switching timing between the friction braking and the regenerative braking. It should be noted that the SOC specified value (SOC0) can be obtained as follows.

First, a charging electric energy of the battery 2 in a period after the electric vehicle 100 has entered the state of just before stop of the vehicle and before the electric vehicle 100 has become in an equal power state where the regenerative electric power of the motor 1 is equal to the power consumption of the electric vehicle 100 is obtained as a specified charging electric energy Ws0 with calculation or experiment. It should be noted that the equal power state corresponds to boundaries between the charge region and the discharge region in the charging current table in FIG. 9.

Here, the specified charging electric energy Ws0 is different depending on, for example, the gradient of the road surface and an operating point of the motor 1. Therefore, corresponding to combinations of the gradient, the operating point of the motor 1, and the like that are possibly considered, a plurality of charging electric powers of the battery 2 until the electric vehicle 100 has become in the equal power state are calculated with, for example, the experiment or the calculation. The maximum value among these calculated values can be obtained as the specified charging electric energy Ws0.

Then, using the specified charging electric energy Ws0 and the maximum capacity Wmax of the battery 2, SOC0 as the SOC specified value is obtained in following Equation (15).

[Equation 17]

$$SOC0 = \frac{W\max - Ws0}{W\max} \times 100[\%] \quad (15)$$

When this embodiment is compared with the first embodiment, for the processes by the motor controller 14, the processes illustrated in FIG. 3, FIG. 6, and FIG. 7 are identical, and the stop control process in FIG. 5 and the command value calculation process in FIG. 8 are different. Therefore, the following describes the stop control process and the command value calculation process.

Figure 16:
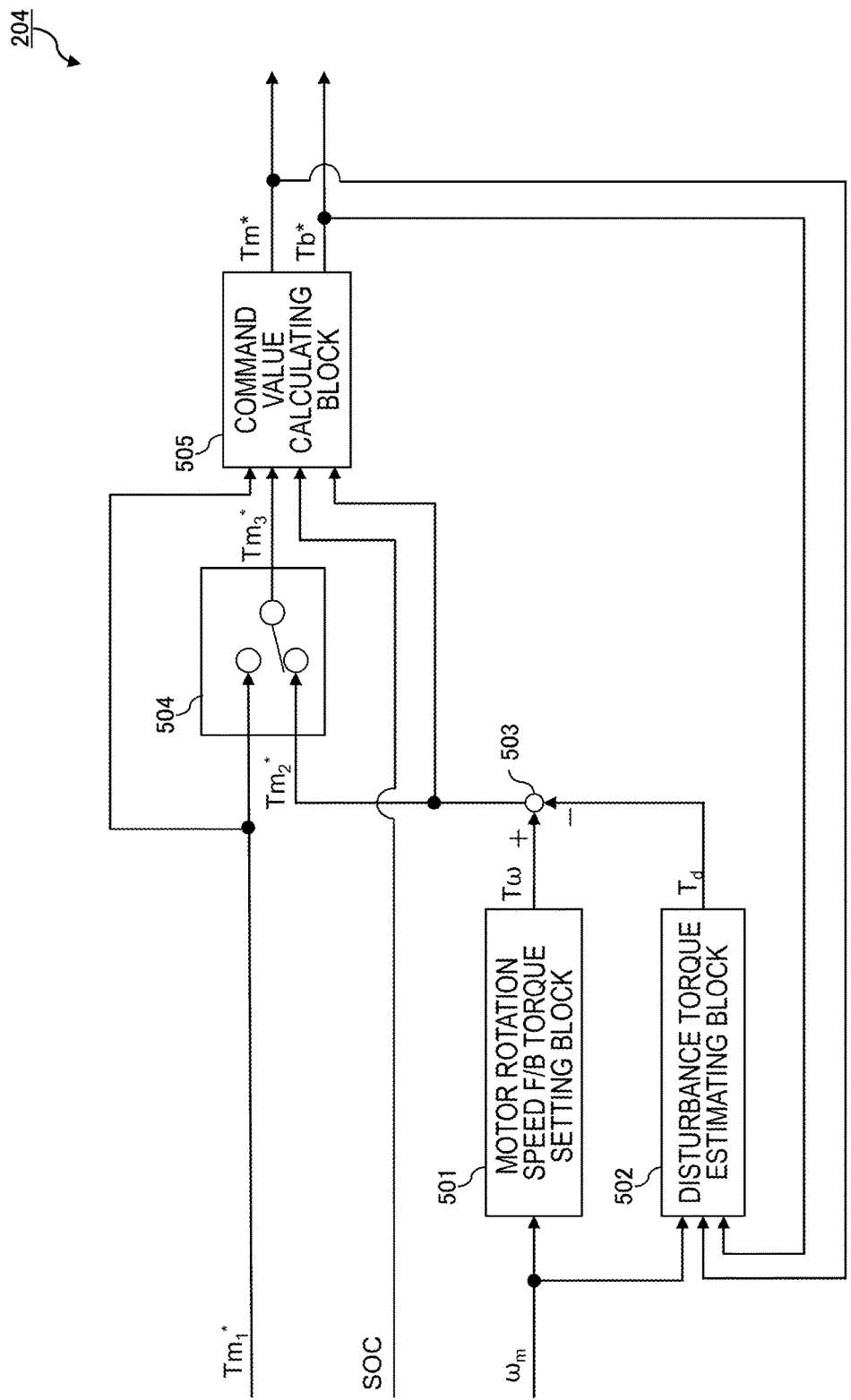
FIG. 16 is a block diagram illustrating a stop control process.

FIG. 16 is a block diagram illustrating the stop control process of the second embodiment.

The stop control process illustrated in FIG. 16, compared with the stop control process of the first embodiment illustrated in FIG. 5, is different in that the SOC, not the regenerable electric power Pin, is input to the command value calculating block 505, that the first torque target value $Tm_1^*$ and the second torque target value $Tm_2^*$ are additionally input, and that the motor rotation speed $\omega_m$ is not input, and other configurations are identical.

Figure 17:
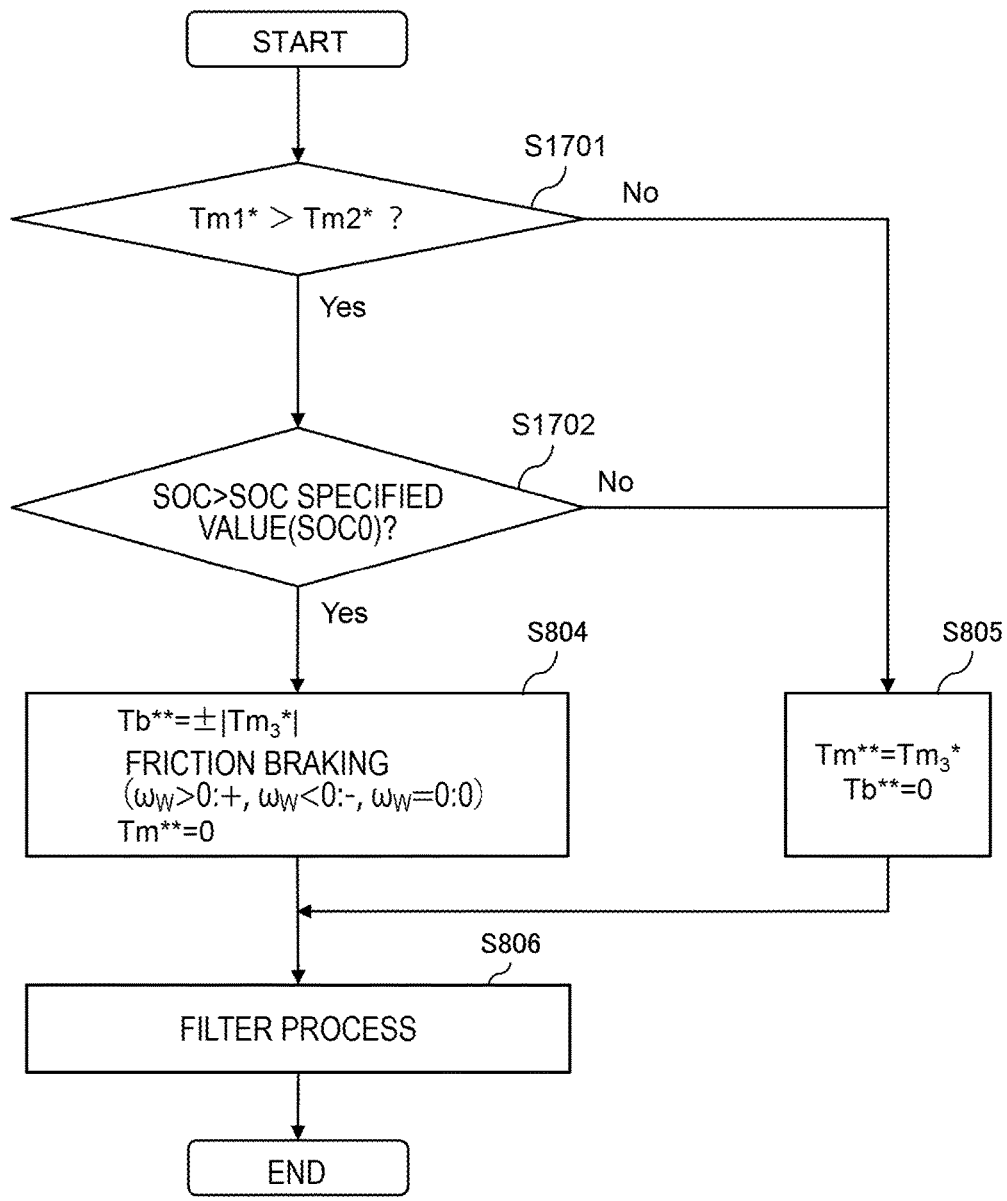
FIG. 17 is a flowchart illustrating a command value calculation control.

FIG. 17 is a flowchart illustrating the command value calculation process of the second embodiment.

The command value calculation process illustrated in FIG. 17, compared with the command value calculation process of the first embodiment illustrated in FIG. 8, 3801 to S803 are removed, and S1701 and S1702 are added.

At Step S1701, the motor controller 14 determines whether it is in the state of just before stop of the vehicle or not by comparing the first torque target value $Tm_{1*}$ to the second torque target value $Tm_{2*}$, to determine whether the regenerative braking is started.

When the first torque target value $Tm_{1*}$ is greater than the second torque target value $Tm_{2*}$ (S1701: Yes), the electric vehicle 100 is determined not in the state of just before stop of the vehicle. In such a case, the motor controller 14 advances the process to S1702.

On the other hand, when the first torque target value $Tm_{1*}$ is equal to or less than the second torque target value $Tm_{2*}$ (S1701: No), the electric vehicle 100 is determined in the state of just before stop of the vehicle. In such a case, the motor controller 14 advances the process to S805 to perform the regenerative braking.

At Step S1702, the command value calculating block 505 determines whether the SOC transmitted from the battery controller 13 is equal to or more than the SOC specified value not.

When the SOC is equal to or more than the SOC specified value (S1702: Yes), the motor controller 14 selects the friction braking to advance the process to S804.

On the other hand, when the SOC is smaller than the SOC specified value (S1702: No), the motor controller 14 selects the regenerative braking to advance the process to S805.

Here, the processes at S1701 and S1702 will be described by dividing the case where the electric vehicle 100 is in the ordinary running state not in the state of just before stop of the vehicle from the case where the electric vehicle 100 is in the state of just before stop of the vehicle.

First, the case where the electric vehicle 100 is in the ordinary running state will be described.

At S1701, the electric vehicle 100 is in the ordinary running state not in the state of just before stop of the vehicle. Since the first torque target value $Tm_{1*}$ is greater than the second torque target value $Tm_{2*}$ (S1701: Yes), the motor controller 14 advances the process to the process at S1702.

At S1702, when the SOC is equal to or more than the SOC specified value (S1702: Yes), the friction braking is selected to advance the process to S804. On the other hand, when the SOC is smaller than the SOC specified value (S1702: No), the regenerative braking is selected to advance the process to S805.

Accordingly, when the electric vehicle 100 is in the ordinary running state, such processes are performed to charge the battery 2 up to the capacitance that the SOC does not exceed the SOC specified value. Accordingly, at the timing when the electric vehicle 100 becomes in the state of just before stop of the vehicle from the running state, the SOC of the battery 2 does not exceed the SOC specified value, and becomes a value close to the SOC specified value.

The following describes the case where the electric vehicle 100 is in the state of just before stop of the vehicle.

At S1701, the electric vehicle 100 is in the state of just before stop of the vehicle. Since the first torque target value $Tm_{1*}$ is equal to or less than the second torque target value $Tm_{2*}$ (S1701: No), the motor controller 14 selects the regenerative braking to advance the process to the process at S805.

As described above, in the state of just before stop of the vehicle, the SOC of the battery 2 does not exceed the SOC specified value. Therefore, in the battery 2, there is an available capacity equal to or more than the specified charging electric energy Ws0.

Accordingly, in the state of just before stop of the vehicle (S1701: No), such that the motor controller 14 selects the regenerative braking (S805), even if the battery 2 is charged by the specified charging electric energy Ws0 until becoming in the equal power state, the battery 2 is not overcharged.

As described above, at 81701 and S1702, the motor controller 14 generates the regenerative braking force by the motor 1 from the time point when the electric vehicle 100 has entered the state of just before stop of the vehicle, thus starting vehicle stop control to stop the electric vehicle 100 (S1701: NO, S805). In such a case, after the stop control starts and before the regenerative electric power by the motor 1 and the power consumption consumed by the electric vehicle 100 become equal, the battery 2 will be charged by the specified charging electric energy Ws0. Therefore, before the electric vehicle 100 becomes in the state of just before stop of the vehicle, that is, before the vehicle stop control is started, such that the available capacity of the battery 2 becomes equal to or more than the specified charging electric energy Ws0, the generation of the regenerative braking force by the motor 1 is controlled (S1701: Yes, S1702).

It should be noted that, in this embodiment, the processes at S801 to S803 in FIG. 8 in the first embodiment are not performed. However, the processes at S801 to S803 may be performed. For example, even in the case where the SOC of the battery 2 is exceeding the SOC specified value, when the electric vehicle 100 becomes in the state of just before stop of the vehicle (S1701: No), the regenerative braking is possibly performed (S805). In such a case, before becoming in the equal power state, the SOC of the battery 2 possibly becomes 100% to overcharge the battery 2. However, by performing the processes at S801 to S803, when the battery 2 is fully charged, the regenerable electric power Pin is zero (S801). Thus, depending on the size of the charging current Ic, the friction braking or the regenerative braking is selected (S802 to S805). Accordingly, this can prevent the battery 2 from being overcharged, similar to the first embodiment.

The battery controller 13 and the motor controller 14 may include a charge control device that controls the charge of the battery 2 so that the SOC of the battery 2 is equal to or less than the SOC specified value before the predetermined timing. For example, in the case where the electric vehicle 100 is running on a freeway or the like, and the vehicle speed is faster than a predetermined lower limit speed, the charge control device performs the regenerative braking such that the SOC does not exceed the SOC specified value. Thus, since the available capacity of the battery 2 is equal to or more than the specified charging electric energy Ws0 on a high-speed vehicle area, the vehicle can stop by the regenerative braking, and further, by increasing the remaining amount of the battery 2, a runnable distance of the electric vehicle 100 can be extended.

In this embodiment, the timing when the first torque target value $Tm_{1*}$ becomes smaller than the second torque target value $Tm_{2*}$ is the timing to start the regenerative braking, by being assumed as the timing when the electric vehicle 100 becomes in the state of just before stop of the vehicle. However, it is not limited to this. For example, a timing when the speed of the electric vehicle 100 becomes equal to or less than a predetermined speed (for example, 20 km/h) may be the timing to start the regenerative braking, by being assumed as the timing when the electric vehicle 100 becomes in a low-speed state. In such a case, the motor controller 14, as the specified charging electric energy Ws0, preliminarily stores the electric power by which the battery 2 is charged after the speed of the electric vehicle 100 has become equal to or less than the predetermined speed and before becoming in the equal power state. Then, at S1701, whether the speed of the electric vehicle 100 exceeds the predetermined speed or not is determined.

The effect by the second embodiment will be described by referring to the charging current table in FIG. 18.

Figure 18:
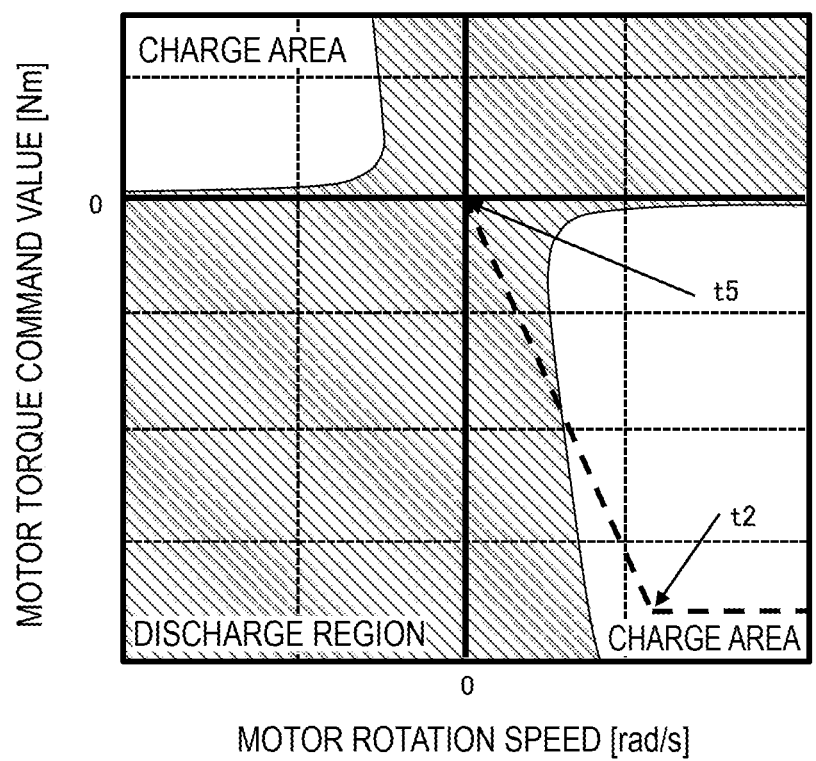
FIG. 18 is a charging current table illustrating an operation of the electric vehicle.

FIG. 18 is an exemplary charging current table, on which change in the running state of the electric vehicle 100 according to the embodiment is indicated with the dotted line.

For example, at the time t2, the electric vehicle 100 is determined to be in the state of just before stop of the vehicle (S1701: No). In such a case, the electric vehicle 100 has entered the state of just before stop of the vehicle, and before the regenerative electric power and power consumption become equal, that is, before reaching the boundary between the discharge region and the charge region, the battery 2 will be charged by the specified charging electric energy Ws0. As described above, when the electric vehicle 100 is in the state of just before stop of the vehicle, the SOC is equal to or less than the SOC specified value. That is, since the available capacity of the battery 2 is equal to or more than the specified charging electric energy Ws0, the motor controller 14 starts the regenerative braking (S805). Accordingly, in this embodiment, the regenerative braking is started from the time t2.

On the other hand, in the first embodiment, for example, with reference to FIG. 12 (b), the regenerative braking starts from the time tc when the transition is performed from the charge region to the discharge region. Therefore, in the second embodiment, the time to perform the regenerative braking is long compared with the first embodiment. Accordingly, the vehicle can stop by the regenerative braking irrespective of the remaining amount of the battery 2, and further, an opportunity to perform the regenerative braking increases. Thus, the accelerated vibration and the variation can be further reduced when the vehicle stops.

It should be noted that, in the command value calculation process in FIG. 17, by further performing the processes at S801 to S803 in the first embodiment, the battery 2 can be prevented from being overcharged. After the electric vehicle 100 has entered the state of just before stop of the vehicle, and further, even in the discharge region in the charging current table as illustrated in FIG. 18 or the like, the regenerative braking can be performed. Furthermore, since the opportunity to perform the regenerative braking increases, the accelerated vibration and the variation can be further reduced when the vehicle stops.

According to the motor controller 14 that is the control device of the second embodiment, before the electric vehicle 100 becomes in the state of just before stop of the vehicle, the charge of the battery 2 is controlled so that the available capacity of the battery 2 is equal to or more than the specified charging electric energy Ws0. Therefore, when the electric vehicle 100 becomes in the state of just before stop (S1701: Yes), the SOC of the battery 2 is equal to or less than the SOC specified value. Thus, even if the regenerative braking is performed (S805), the battery 2 is not overcharged.

The second embodiment provides the following effects.

The control device of the electric vehicle of the second embodiment, when the electric vehicle 100 becomes just before stop of the vehicle, generates the regenerative braking force by the motor 1 to start the vehicle stop control to stop the electric vehicle 100 (S1701: NO, S805). After this vehicle stop control starts, and before the regenerative electric power and the power consumption consumed in the electric vehicle 100 become equal, the battery 2 is charged by the specified charging electric energy Ws0. Therefore, by the state of just before stop of the vehicle, that is, by the start of the vehicle stop control, the generation of the regenerative braking force by the motor 1 is controlled so that the available capacity of the battery 2 is equal to or more than the specified charging electric energy Ws0 (S1701: Yes, S1702).

Thus, in the time point when the regenerative electric power and the power consumption in the electric vehicle 100 become equal, the battery 2 is charged by the specified charging electric energy Ws0 to make the battery 2 be in the full charge state. Thus, compared with the first embodiment, the runnable distance of the electric vehicle 100 in the vehicle stop state can be made long. By performing the regenerative braking before the regenerative electric power and the power consumption consumed by the electric vehicle 100 become equal, the time to perform the regenerative braking until the electric vehicle 100 stops can be made long. Thus, the electric vehicle 100 can further smoothly stop.

Third Embodiment

Next, a description will be given of the electric vehicle 100 that includes a control device of a third embodiment. In the second embodiment, as the specified charging electric energy Ws0, a regenerative electric energy generated between a time point at which the electric vehicle 100 becomes in the state of just before stop of the vehicle and a time point at which the vehicle stops is preliminarily predicted. In this embodiment, a description will be given of an example where the charging electric energy Ws is predicted corresponding to a running state of the electric vehicle 100.

The electric vehicle 100 of the third embodiment has a configuration identical to the configuration of the electric vehicle 100 of the first embodiment illustrated in FIG. 1. Then, the explanation of the configuration will be omitted.

When this embodiment is compared with the first embodiment, the processes illustrated in FIG. 3, FIG. 5, FIG. 6, and FIG. 7 are identical, and the command value calculation process in FIG. 8 is different. Therefore, the following describes only the command value calculation process, and omits the explanation of the other processes.

Figure 19:
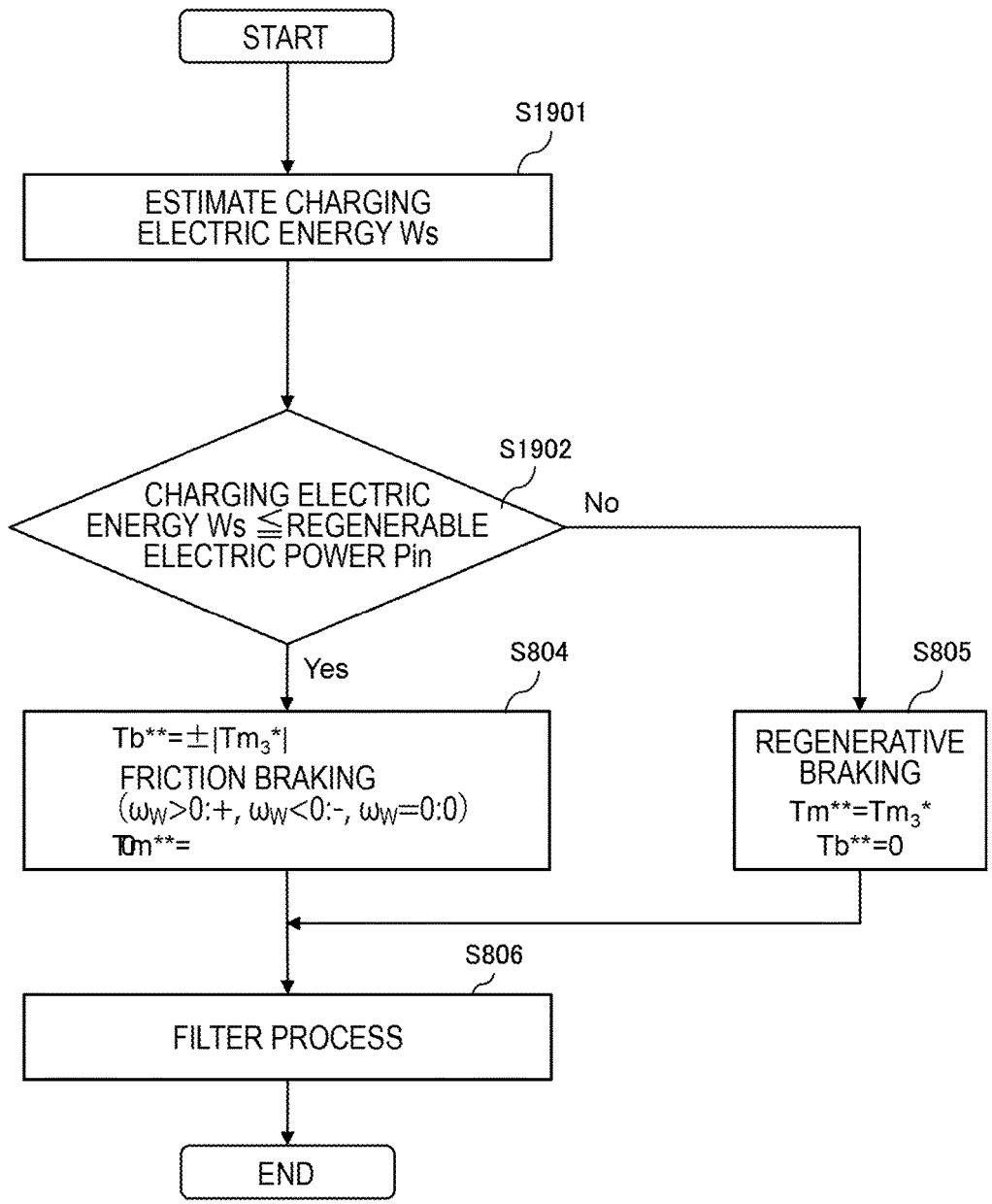
FIG. 19 is a flowchart illustrating a command value calculation control performed by a motor controller of a third embodiment.

FIG. 19 is a view illustrating the command value calculation process of the third embodiment.

The command value calculation process illustrated in FIG. 19, compared with the command value calculation process of the first embodiment illustrated in FIG. 8, S801 to S803 are removed, and S1901 and S1902 are added.

Figure 20:
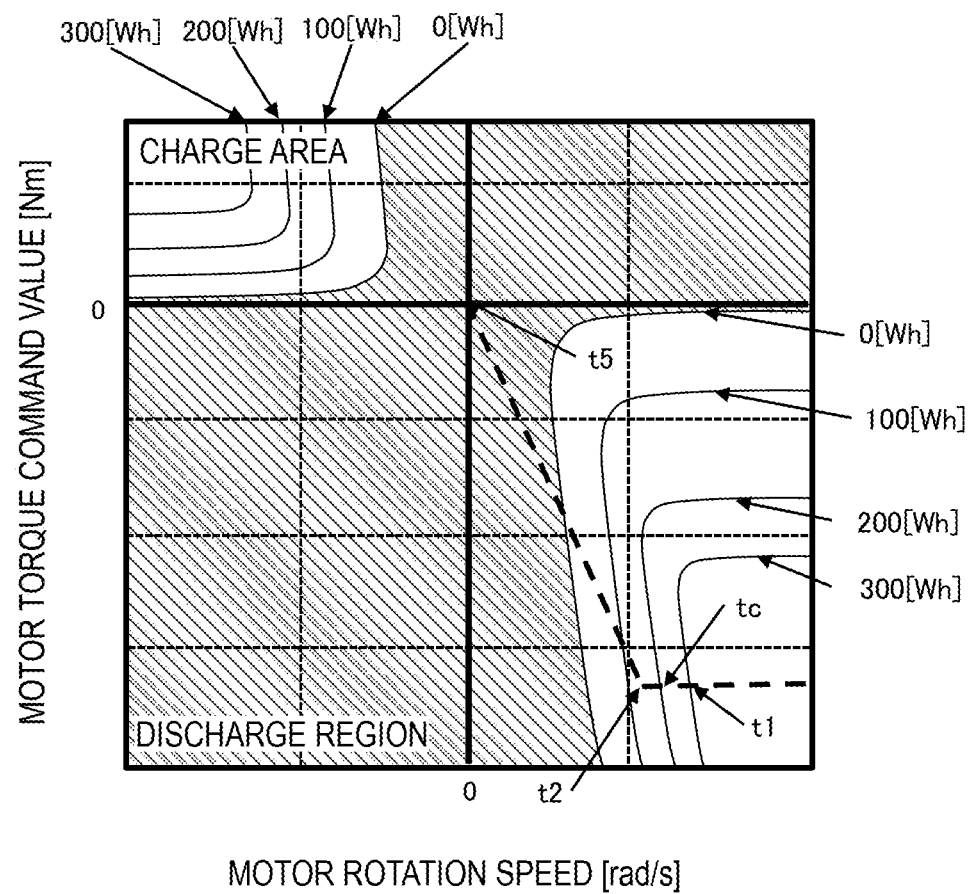
FIG. 20 is a charging current table illustrating an operation of the electric vehicle.

At Step S1901, the command value calculating block 505 uses the third torque target value Tm$_{3*}$, the motor rotation speed $\omega_m$, and a vehicle-stop regenerative electric power table in FIG. 20 to predict the charging electric energy Ws of the battery 2 until the regenerative electric power becomes equivalent to the power consumption to be in the equal power state when the regenerative braking is started.

Here, FIG. 20 illustrates a charging electric energy table where the motor torque command value Tm and the motor rotation speed $\omega_m$ are corresponded to the charging electric energy Ws. A horizontal axis indicates the motor rotation speed $\omega_m$ and a vertical axis indicates the motor torque command value Tm*. An exemplary running condition of the electric vehicle 100 according to the embodiment is indicated by a dotted line. It should be noted that the charging electric energy Ws in the drawing is merely an example and not limited to the value.

In FIG. 20, in the case where the regenerative braking is started, equal electric-energy lines are used to indicate the charging electric energy Ws of the battery 2 in a time period where the regenerative electric power of the motor 1 becomes equivalent to the power consumption in the electric vehicle 100, that is, until reaching a boundary of the charge region and the discharge region. For example, when a position indicated by the motor rotation speed $\omega_m$ and the motor torque command value Tm of the electric vehicle 100 is on the equal electric-energy line of 200 Wh, the electric energy charged to the battery 2 before the regenerative electric power becomes equivalent to the power consumption after the start of the regenerative braking is 200 Wh. It should be noted that the boundary of the charge region and the discharge region is the equal electric-energy line of 0 Wh.

The motor controller 14 obtains the charging electric energy Ws on the basis of such reference site of the motor torque command value Tm* and the motor rotation speed $\omega_m$ in the charging electric energy table in FIG. 20. It should be noted that, when the equal electric-energy line does not exist on the reference site, the charging electric energy Ws may be predicted corresponding to, for example, a ratio of distances between the reference site and two equal electric-energy lines across the reference site.

With reference to FIG. 19 again, at Step S1902, the command value calculating block 505 compares the charging electric energy Ws with a volume of the available capacity of the battery 2, and selects the regenerative braking (S805) by the motor 1 or the friction braking (S804) by the friction braking unit 7 corresponding to the comparison result.

When the charging electric energy Ws is greater than the available capacity of the battery 2 (S1902: Yes), the motor controller 14 determines that the start of the regenerative braking causes the charging electric energy Ws until the regenerative electric power becomes equivalent to the power consumption to exceed the available capacity of the battery 2, thus possibly excessively charging the battery 2. Therefore, the motor controller 14 selects the friction braking to advance the process to S804.

On the other hand, when the charging electric energy Ws is equal to or less than the available capacity of the battery 2 (S1902: No), the motor controller 14 determines that the start of the regenerative braking causes the battery 2 to be appropriately charged without being excessively charged. Therefore, the motor controller 14 selects the regenerative braking to advance the process to S805.

Here, with reference to FIG. 20, the operation of the electric vehicle 100 will be described. In FIG. 20, the running condition of the electric vehicle 100 running on a flat road is indicated by the dotted line. It should be noted that, for convenience, assume that the available capacity of the battery 2 is 200 Wh, and does not vary.

At a time t1, the charging electric energy Ws is 300 Wh. Accordingly, since the charging electric energy Ws (300 Wh) is greater than the available capacity of the battery 2 (200 Wh) (S1902: Yes), the motor controller 14 determines that the start of the regenerative braking possibly causes the battery 2 to be excessively charged, thus selecting the friction braking (S804).

At a time tc, the charging electric energy Ws is 200 Wh. Since the charging electric energy Ws becomes equivalent to the available capacity of the battery 2 (200 Wh) (S1902: No), the motor controller 14 starts the regenerative braking. After the time tc, the regenerative braking is performed.

At a time t2, the electric vehicle 100 becomes in the state of just before stop of the vehicle, and the third torque target value $Tm_{3*}$ to be the motor torque command value starts converging into the disturbance torque estimated value Td (zero). Therefore, the vehicle speed of the electric vehicle 100 gradually converges to zero.

At a time t5, the electric vehicle 100 completely stops.

The third embodiment provides the following effects.

With reference to the command value calculation control in FIG. 19, the motor controller 14 as the control device for the electric vehicle according to the third embodiment calculates the charging electric energy Ws as the electric energy charged to the battery 2 before the regenerative electric power of the motor 1 becomes equivalent to the power consumption of the electric vehicle 100 when the electric vehicle 100 starts the regenerative braking (S1901). Then, when the charging electric energy Ws is equal to or less than the available capacity of the battery 2, that is, the available capacity of the battery 2 is greater than the charging electric energy Ws (1902: No), the regenerative braking is selected (S805). Therefore, the charging electric energy Ws equivalent to the available capacity of the battery 2 is charged to the battery 2 before the regenerative electric power becomes equivalent to the power consumption.

The available capacity of the battery 2 used for the determination at S1902 in the command value calculation process in FIG. 19 is zero or a positive value. With reference to the charging current table in FIG. 20, the charging electric energy Ws converges to zero before the electric vehicle 100 decelerates to reach the boundary of the charge region and the discharge region. Then, before the electric vehicle 100 stops, the charging electric energy Ws always becomes below the available capacity of the battery 2, thus performing the regenerative braking. Accordingly, in addition that the electric vehicle 100 stops always due to the regenerative braking irrespective of the remaining amount of the battery 2, the battery 2 is further charged in the charge region in FIG. 20 so as to become in a state of full charge on the transition to the discharge region, thus ensuring extending the runnable distance of the electric vehicle 100.

The embodiment of the present invention described above merely describes some application examples of the present invention and not of the nature to limit the technical scope of the present invention to the specific constructions of the above embodiment.

The invention claimed is:

1. A control device for an electric vehicle that generates a braking force corresponding to an opening degree of an accelerator pedal to decelerate the electric vehicle, the control device for the electric vehicle comprising:
   a motor configured to generate a driving force or a regenerative braking force of the electric vehicle;
   a friction braking unit configured to generate a friction braking force;
   a battery charged by the regenerative electric power from the motor; and
   a controller configured to control at least one of the motor and the friction braking unit corresponding to the opening degree of the accelerator pedal, wherein:
   the controller determines whether the battery is regenerative or not based on an available capacity of the battery;
   the controller generates the braking force by the motor when the controller determines that the battery is regenerative;
   the controller determines whether all of the regenerative electric power generated by the motor is consumed in the electric vehicle when the controller determines that the battery is not regenerative, and
   the controller generates the regenerative braking force by the motor when the controller determines that all of the regenerative electric power is consumed in the electric vehicle.

2. The control device according to claim 1, wherein the controller determines whether all of the regenerative electric power is consumed in the electric vehicle corresponding to a running condition of the electric vehicle and the opening degree of the accelerator pedal.

3. The control device according to claim 1, wherein the controller calculates a charging electric energy charged to the battery until the regenerative electric power becomes equal to a power consumption consumed in the electric vehicle, and
the controller generates the regenerative braking force by the motor when an available capacity of the battery is greater than the charging electric energy.

4. The control device according to claim 1, wherein the controller controls, before a start of a stop control that generates the regenerative braking force by the motor to stop the electric vehicle, the generation of the regenerative braking force by the motor such that the available capacity of the battery becomes equal to or more than a specified charging electric energy charged to the battery from the start of the stop control to a timing at which the regenerative electric power becomes equal to a power consumption consumed in the electric vehicle.

5. The control device according to claim 1, wherein the controller generates the friction braking force before the regenerative electric power becomes equal to a power consumption consumed in the electric vehicle, and
the controller controls the regenerative braking force by the motor so as to compensate a delay of a responsiveness of the friction braking unit in a case of causing the motor to perform the regenerative braking when the regenerative electric power is determined to be consumed in the electric vehicle.

6. The control device according to claim 1, wherein the controller calculates a disturbance torque estimated value necessary for holding a vehicle stop state of the electric vehicle corresponding to a disturbance acting on the electric vehicle, and
the controller controls a torque generated by the motor so as to converge to the disturbance torque estimated value in a state where the electric vehicle is just before stop of the vehicle.

7. A control method for an electric vehicle that includes a motor, a friction braking unit and a battery, the motor being configured to generate a driving force or a regenerative braking force of the electric vehicle corresponding to an opening degree of an accelerator pedal, the friction braking unit being configured to generate a friction braking force, the battery charged by the regenerative electric power from the motor, the control method for the electric vehicle generating a braking force corresponding to the opening degree of the accelerator pedal to decelerate the electric vehicle, the control method for the electric vehicle comprising:

a first determining step of determining whether the battery is regenerative or not based on an available capacity of the battery, a generating step of generating the braking force by the motor alone when the battery is determined to be regenerative, a second determining step of determining whether all of regenerative electric power generated by the motor is consumed in the electric vehicle when the battery is determined not to be regenerative, and a controlling step of controlling the motor to perform the regenerative braking when all of the regenerative electric power is determined to be consumed in the electric vehicle in the determining.

* * * * *